US009852376B2

(12) United States Patent
Donoho et al.

(10) Patent No.: US 9,852,376 B2
(45) Date of Patent: Dec. 26, 2017

(54) METHOD AND APPARATUS FOR CERTIFICATION OF FACTS

(71) Applicant: Factify, Stanford, CA (US)

(72) Inventors: David Leigh Donoho, Stanford, CA (US); Matan Gavish, Stanford, CA (US)

(73) Assignee: Factify, a Delaware Corporation, Stanford, CA (US)

( * ) Notice: Subject to any disclaimer, the term of this patent is extended or adjusted under 35 U.S.C. 154(b) by 0 days.

(21) Appl. No.: 14/746,212

(22) Filed: Jun. 22, 2015

(65) Prior Publication Data

US 2015/0310338 A1   Oct. 29, 2015

Related U.S. Application Data

(63) Continuation of application No. 13/411,263, filed on Mar. 2, 2012, now Pat. No. 9,064,238.

(Continued)

(51) Int. Cl.
| | |
|---|---|
| *G06N 5/04* | (2006.01) |
| *G06Q 10/10* | (2012.01) |
| *G06Q 40/02* | (2012.01) |
| *G06Q 40/08* | (2012.01) |
| *G06Q 50/18* | (2012.01) |
| *G06Q 50/26* | (2012.01) |
| *G06N 5/02* | (2006.01) |

(52) U.S. Cl.
CPC ............. *G06N 5/04* (2013.01); *G06N 5/022* (2013.01); *G06Q 10/101* (2013.01); *G06Q 40/02* (2013.01);

(Continued)

(58) Field of Classification Search
CPC ...................................................... G06N 5/04
See application file for complete search history.

(56) References Cited

U.S. PATENT DOCUMENTS

| 5,638,446 A | 6/1997 | Rubin | |
|---|---|---|---|
| 6,327,656 B2 * | 12/2001 | Zabetian | ........................ 380/260 |

(Continued)

FOREIGN PATENT DOCUMENTS

| CN | 101213786 A | 7/2008 |
|---|---|---|
| CN | 101459509 A | 6/2009 |

OTHER PUBLICATIONS

"Audit Tracker—Driving Assurance to the Next Level", website—http-www-actionbase.com/solutions/audit-tracker; document date Mar. 2, 2012, pp. 1-2.

(Continued)

*Primary Examiner* — Alan Chen
(74) *Attorney, Agent, or Firm* — Michael A. Glenn; Perkins Coie LLP

(57) ABSTRACT

A method and apparatus for certification of facts introduces a certifier and a fact certificate into the fact-exchange cycle that enables parties to exchange trustworthy facts. Certification is provided to a fact presenter during the first part of the fact-exchange cycle, and verification is provided to the fact receiver during the last part of the cycle. To request a certification, a fact presenter presents the Certifier with a fact. In return, the certifier issues a fact certificate, after which the fact presenter presents the fact certificate to the fact receiver instead of presenting the fact itself. The receiver inspects the received certificate in order to evaluate the fact's validity and trustworthiness. For some facts and notions of verification, the certificate is sufficient and its inspection does not require any communication. For others, the receiver requests a verification service from the Certifier in order to complete the verification.

42 Claims, 19 Drawing Sheets

Related U.S. Application Data

(60) Provisional application No. 61/449,496, filed on Mar. 4, 2011.

(52) U.S. Cl.
CPC ............. *G06Q 40/08* (2013.01); *G06Q 50/18* (2013.01); *G06Q 50/26* (2013.01)

(56) References Cited

U.S. PATENT DOCUMENTS

| | | | |
|---|---|---|---|
| 8,949,706 B2* | 2/2015 | McCabe | G06Q 10/10 |
| | | | 713/179 |
| 2005/0086180 A1 | 4/2005 | Wamsley et al. | |
| 2009/0063289 A1 | 3/2009 | Byrd et al. | |
| 2010/0050233 A1 | 2/2010 | Ross | |
| 2010/0106558 A1 | 4/2010 | Li et al. | |
| 2010/0211907 A1* | 8/2010 | Hughes, Jr. | G06F 21/51 |
| | | | 715/781 |
| 2010/0287260 A1* | 11/2010 | Peterson | G06Q 10/10 |
| | | | 709/219 |
| 2010/0313032 A1* | 12/2010 | Oswalt | H04L 63/123 |
| | | | 713/176 |
| 2011/0287748 A1* | 11/2011 | Angel | H04M 3/42221 |
| | | | 455/414.1 |

OTHER PUBLICATIONS

"Executable Paper Grand Challenge—Rules", http-www-executablepapers.com/contest-rules.html, downloaded Mar. 2, 2012, 1 page.

"Federal Information Processing Standards Publication 180-2, Secure Hash Standard, Institute of Standards and Technology", Aug. 1, 2002, 83 pages.

"Federal Information Processing Standards Publication 180-3, Secure Hash Standard, Institute of Standards and Technology", Oct. 2008, 32 pages.

"State of Connecticut vs Alfred Swinton", Supreme Court of Connecticut, 268 Conn. 781, Argued Sep. 26, 2003, Released May 11, 2004, 46 pages.

"The Executable Paper Grand Challenge—Meet the Winners", website—http-www-executablepapers.com, 2001, downloaded Mar. 3, 2012, pp. 1-3.

Donoho, David et al., "A Universal Identifier for Computational Results", website—http-aaas.confex.com/aaas/2011/webprogram/Paper4128.html, Feb. 19, 2011, 1 page.

Folk, et al., "HDF5 Data Model, File Format and Library—HDF5 1.6; NASA Earth Science Data System Working Groups—RFC 007, 207", University of California; Jan. 2007, 42 pages.

Gavish, Matan et al., "A Universal Identifier for Computational Results", Procedia Computer Science 4, proceedings of ICCS, 2011, pp. 637-647.

Kevles, Daniel J., "The Baltimore Case", W.W. Norton & Co., New York, ISBN 0-393-04103-4; see website_link_http://books.google.com/books?id=hBB7-vrk4fAC&printsec=frontcover#v=onepage&q&f=false; 1998, 1 page.

Reich, Eugenie S., "Cancer Trial Errors Revealed", Macmillan Publishers Limited; Nature; vol. 469; Jan. 13, 2011, pp. 139-140.

Reich, Eugenie S., "Missing Part Delays Space Mission", News in Focus; Nature; vol. 469; Jan. 20, 2011, p. 280.

\* cited by examiner

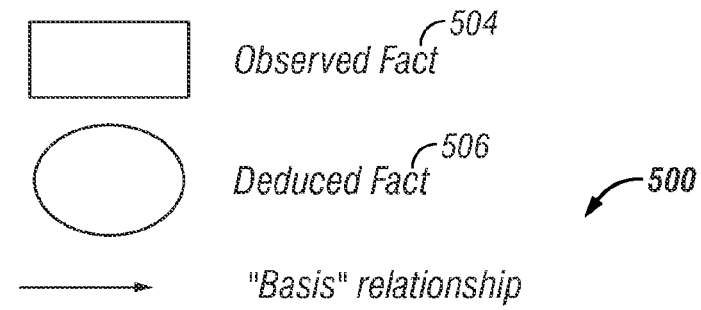
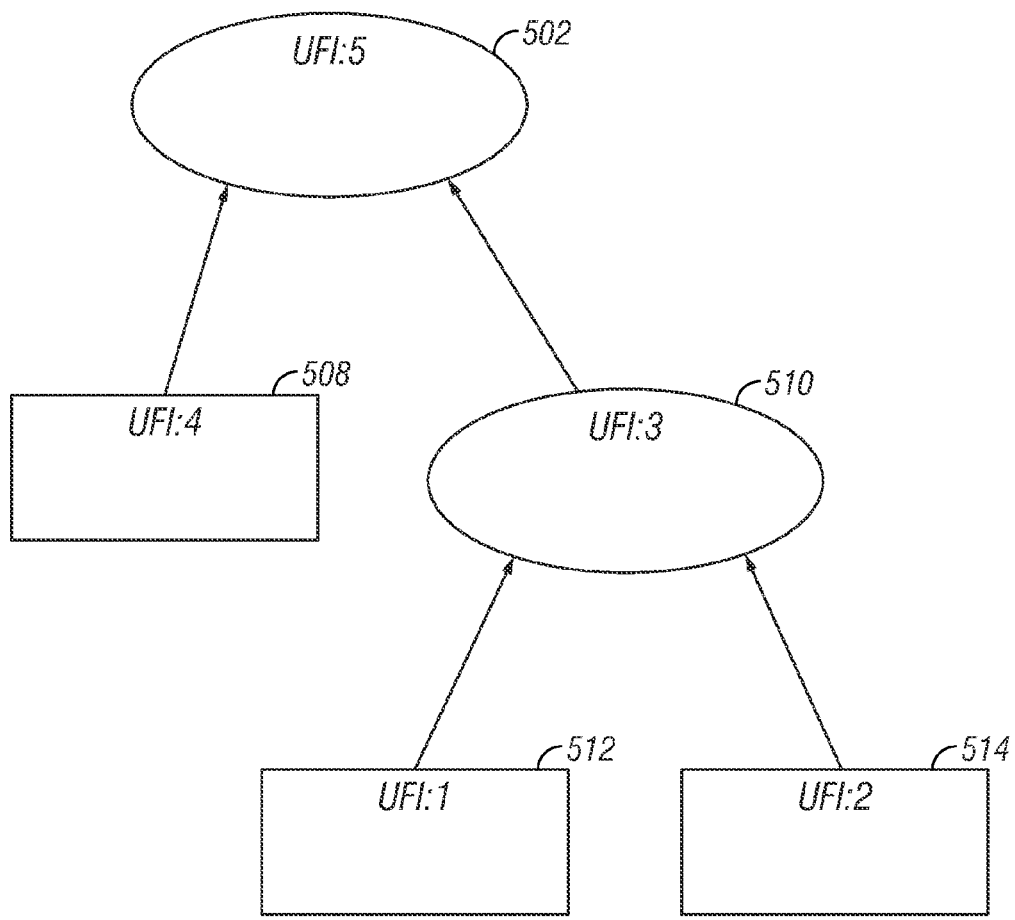
FIG. 5

METHOD AND APPARATUS FOR CERTIFICATION OF FACTS

CROSS REFERENCE TO RELATED APPLICATIONS

This application is a Continuation of U.S. application Ser. No. 13/411,263, filed 2 Mar. 2012, which claims priority from U.S. provisional Application No. 61/449,496, filed 4 Mar. 2011, each of which is incorporated herein in its entirety by this reference thereto.

BACKGROUND

1. Technical Field

The invention relates to the field of information trustworthiness and verification. More particularly, the invention relates to a method and apparatus for certification of facts.

2. Description of Related Technology

Exchange of trustworthy information between two parties is a fundamental element of communication in modern society. The ability to exchange trustworthy information is a necessary condition for all cooperation between pairs of interacting parties across all walks of modern society, including commerce, business, government, law, science, insurance and medicine.

Exchange of numerical, textual and digital information provides a basis for interaction in commerce, business, government, law, science, insurance and medicine. Customarily, such information is exchanged using documents of a standard form made for this purpose. Examples of such documents across various domains includes invoices, payable bills, bank account statements, credit card statements, financial reports, auditing or other accounting reports, appraisal reports, tax return forms, security transaction slips, legal evidence reports, insurance claim forms, scientific experiment reports, clinical study reports, medical files and so on. However, information exchanged during an interaction may take various other forms, such as tables, charts, pictures, audio files, video files and many other forms of digital information.

During the course of an interaction between parties, one party (a fact presenter) may present another party (a fact receiver) with a single or a small number of actionable pieces of information, or facts, which prompt action or cooperation by the receiver. Examples for facts that prompt cooperation are the amount due in a bill, a bank account status, an investment portfolio net worth, corporate annual revenue and total current assets, total taxable income, a photograph submitted as legal evidence, an incident report for an insurance claim, a measurement included in a scientific experiment report, a medical diagnosis, an appraised value of an asset, a result of a clinical study for a new drug, a mortgage monthly payment, a valuation of a company and valuation of a security, and so on. A list of examples of fact-presenter-receiver situations in various domains is presented in Table 1 below:

TABLE 1

| Fact presenter | Fact receiver | Fact |
|---|---|---|
| Bank employee | Bank | Registered transaction |
| Hospital | Medical insurance company | diagnosis |
| Hospital | Medical insurance company | bill |
| Medical insurance company | patient | medical bill |
| Utility company | customer | bill |
| Tax auditor | tax payer | tax due |
| Tax payer | government | tax report |
| Company financial officer | company shareholders | periodical financial reports |
| Medical doctor | patient | diagnosis |
| Land surveyors | local authorities | Map of surveyed area |
| Bank | customer | account balance |
| Credit card company | customer | account balance due |
| Investment manager | investor | portfolio value |
| Securitization trust | investor | security valuation |
| Real estate appraisal professional | owner or buyer | value of property |
| Real estate appraisal professional | insurance company | value of property to be insured |
| Eye witness to event | court | photograph evidnece of event |
| Clinical trials responsible medical officer | Regulatory agency | p-value summarizing statistical significance of trial result |
| Plaintiff in damages case | court | estimate of damages Claimed |

Typically, the parties involved in a particular fact exchange may be a fact presenter and one or more fact receivers.

2.1

To illustrate the notion of a fact, consider a simple, concrete example. A utility company issues a monthly bill to a customer based on an amount of units, for example, energy units such as kilowatt/hour, consumed as measured by a consumption gauge, and the unit price set by the company. The billed amount is a fact presented by the utility company (the presenter) to the customer (the receiver). The facts involved are:

Units consumed, as measured by the consumption gauge device;
Unit price, as observed by the utility company's billing office; and
Billed amount, as calculated by the company's billing office by applying a known procedure (multiplication) to "basis facts": units consumed and unit price.

2.3 The Conventional Fact-Exchange Cycle

The fact-exchange cycle is an entire interaction between fact presenter and receiver regarding a single fact, which includes the fact presentation and subsequent verification or evaluation of trustworthiness. The currently used method to present facts implies that the process of evaluating fact trustworthiness must be ad hoc, inefficient, and costly. As will be seen, a standard way to present trustworthy facts that the receiver may verify or otherwise inspect easily and at will does not currently exist.

Currently, In order to evaluate the trustworthiness of a fact measured or observed by the fact presenter, the fact receiver must:

Request evidence from the fact presenter regarding authenticity of the observation or measurement;
Obtain the evidence from the fact presenter; and
Check that the evidence itself is authentic.

Similarly, in order to evaluate the trustworthiness of a fact deduced by the fact presenter from other basis facts, the fact receiver must:

Understand the reasoning procedure applied (for example, figure out which arithmetic calculation was used);

Identify the basis facts, to which this procedure was applied;

Independently verify each basis fact

Check that the deductive reasoning procedure was applied correctly (for example, that the arithmetic calculation is correct).

For a concrete illustration of the various stages in these exchanges, consider audit accounting offices. A typical auditing task is to verify the facts that constitute the financial reports presented by an individual or an organization. Facts such as total assets or annual revenue are the result of complicated reasoning processes that are applied to an extremely large and complicated factual basis. The fact presenter is the company financial officer. The fact receiver is the audit accountant, a professional fact verifier, on behalf of the company shareholders and government regulators. Audit accountants verify on a test basis some of the observed facts upon which the financial reports are based (ledgers, receipts, etc) and assess their authenticity. They then verify on a test basis that the deductive reasoning processes used to generate the facts in the financial reports were applied correctly.

Following the current verification process can require substantial resources, including many skilled workers and much capital. This can make fact verification practically impossible. Moreover, following the current verification process is sometimes physically impossible, because:

The fact may be based on private information that the presenter cannot disclose to the receiver; or Given the time that may pass between the moment when the fact was presented to the moment when verification is called for, some observed facts can no longer be conclusively authenticated, or the possibility that they were tampered with post facto cannot be conclusively overruled;

Finally, the current verification procedure requires that the fact presenter cooperate with the verification process. Yet the fact presenting entity, which was inclined to cooperate when the fact was presented, may no longer exist or may not be inclined to cooperate when the time for verification comes.

To illustrate the complexity of the verification in the conventional fact-exchange cycle, we return to the simple utility bill example.

FIG. 1 depicts the conventional fact-exchange cycle 100 currently used for presentation and verification of the total bill amount fact. In the fact presentation stage 108, the utility bill form 118, sent by mail to the customer 104 by the utility 102, includes all three facts (units consumed 112, unit price 114 and billed amount 116). During the fact verification stage of the cycle 110, in order to perform its own evaluation 106 of the trustworthiness of the billed amount, the customer must follow the following steps:

Recover the reasoning process 120 that was used to generate the billed amount, namely to understand that the billed amount was calculating by multiplying units consumed by unit price;

To evaluate the trustworthiness of the units consumed fact (that may or may not be stated on the bill), the customer 104 must contact the utility company and request evidence 122 that the consumption as reported by the observer (the measurement gauge) was trustworthy, and that the amount of units consumed as appears on file is an accurate copy of that report 124;

To evaluate the trustworthiness of the unit price fact, the customer must contact the utility company and request evidence 126 that the unit price stated on the bill was indeed the correct price as published by the company at the time the bill was generated 128; and Finally, the customer must verify 130 that the reasoning process that was used to generate the billed amount—a deduced fact—from unit price and units consumed—its basis facts—was executed correctly. This means performing the multiplication and comparing to the billed amount.

In response to customer requests, the utility 102, bears the burden of providing the evidence 132 in response to the customer 104 requests.

In the business, taxation and the insurance domains, entire industries have been formed to evaluate fact trustworthiness, namely audit accounting to evaluate financial reports, tax agencies to evaluate tax reports, and insurance claims departments to evaluate insurance claims.

3. Examples Illustrating Shortcomings of the Conventional Fact-Exchange Cycle

As a result of the difficulties inherent to the current verification process, exchange of facts remains plagued with inaccuracy, error and occasional fraud. In finance, famous recent multi-billion-dollar scandals, such as the late-2000s sub-prime financial crisis in the United States, the collapse of Enron Corporation, the Madoff securities fraud and the MF Global Corporation bankruptcy scandal were all direct results of undue trust that fact receivers had placed in facts that they could not conclusively verify. The following is a brief description of two cases that received media attention in the United States a short while before the submission of this application.

3.1 MF Global Corporation

According to prepared testimony by STANDARD & POORS Ratings Services, Mr. Henri Steenkamp, MF Global CFO, told the agency that he believed the firm's capital and liquidity "had never been stronger" in an October 24 email.

At the MF Global quarterly earnings conference call on Oct. 25, 2011, MF Global CEO Mr. Jon Corzine reported a 191.6 million USD quarterly loss as a result of trading on European government bonds, but said "We've substantially improved our capital and liquidity positions" and expressed confidence in the company's robust financial position. The earnings call transcript is publicly available.

On Sunday, Oct. 30, 2011, a unit of the New York-based brokerage first reported to the Chicago Mercantile Exchange (CME) and the Commodity Futures Trading Commission (CFTC) a "material shortfall" of hundreds of millions of dollars in segregated customer funds.

MF Global filed for bankruptcy on Oct. 31, 2011.

The CME reports that early on Monday, Oct. 31, 2011, officials of MF Global admitted transfer of 700 million USD from customer accounts to the broker-dealer and a loan of 175 USD million in customer funds to MF Global's U.K. subsidiary to cover or mask liquidity shortfalls at the company.

The shortfall in client accounts at MF Global Holdings Ltd was later estimated to be around 1.2 billion USD.

These events illustrate two concrete examples of undue trust that fact receivers placed in facts that they could not verify:

1. The shareholders of the publicly-traded MF Global, or the professional investors who represented them, were misinformed regarding the company's liquidity position at the earnings call that took place only six days prior to the company's filing for bankruptcy protection.

2. The MF Global customers trusted reports by the company, according to which the funds in their accounts were handled according to regulations.

3.2 The Madoff Securities Fraud

The Madoff securities fraud, exposed in 2009 was considered one of the largest financial fraud cases in history. According to *United States* v. *Bernard L. Madoff,* 09 Cr. 213 (DC), starting in the mid 1990's, the Wall street firm Bernard Madoff Investment Securities, LLC had been sending customers of the investment business fake evidence of trades that had not actually occurred. Based on these fake trade slips, the firm sent customers fake portfolio statements of assets they did not actually own.

The Madoff fraud affair illustrates two concrete examples of undue trust that fact receivers placed in facts that they could not verify:

1. The customers (namely, the investors) could not themselves verify that the trade transactions reported on the evidence presented before them were bone-fide.
2. The customers could not themselves verify that the portfolio statements presented before represented assets they owned in reality.

This fraud was made possible by the opaque nature of investment management business: the investment manager (the fact presenter in this case) has privacy concerns regarding the exact nature of the firm's trades. The manager is concerned that exposing the entire transaction history of the firm would expose the firm's proprietary investment strategy.

In the Madoff fraud affair, fact receivers (customers) conceded their ability to evaluate the trustworthiness of facts presented to the presenter's concern for privacy.

SUMMARY

A method and apparatus for certification of facts introduces a certifier and a fact certificate into the fact-exchange cycle that enables parties to exchange trustworthy facts. Certification is provided to a fact presenter during the first part of the fact-exchange cycle, and verification is provided to the fact receiver during the last part of the cycle. To request a certification, a fact presenter presents the fact certifier with a fact. In return, the fact certifier issues a fact certificate, after which the fact presenter presents the fact certificate to the fact receiver instead of presenting the fact itself. The fact receiver inspects the received fact certificate in order to evaluate the fact's validity and trustworthiness. For some facts and notions of verification, the fact certificate is sufficient and its inspection does not require any communication. For others, the fact receiver requests a verification service from the fact certifier in order to complete the verification.

BRIEF DESCRIPTION OF THE DRAWINGS

FIG. 5 provides a deduction chart illustrating the notion of a deduced fact and its basis of facts;

DETAILED DESCRIPTION

Figure 1:
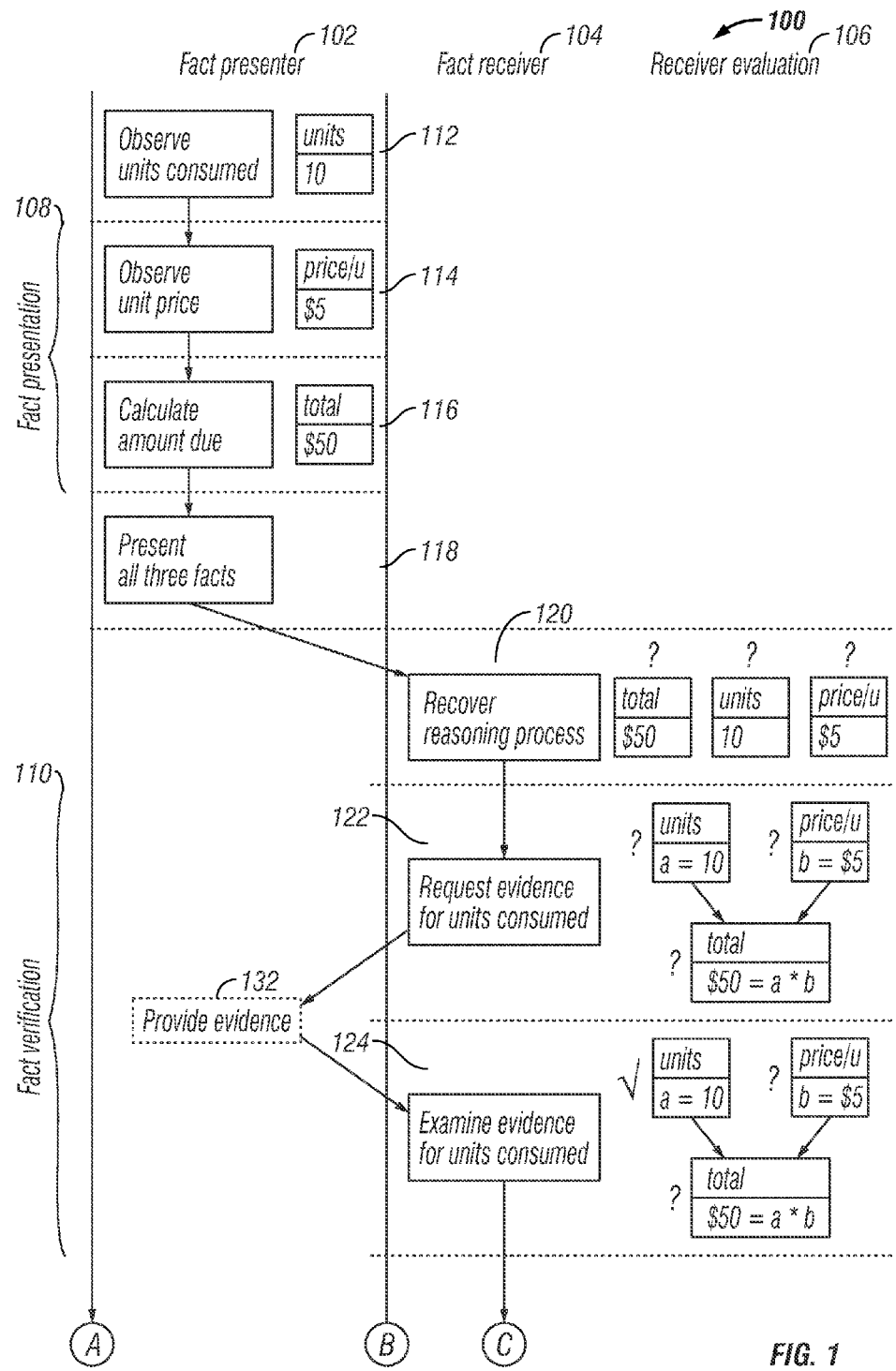
FIG. 1 provides a process chart illustrating a conventional fact-exchange cycle for a simple bill.
Figure 1:
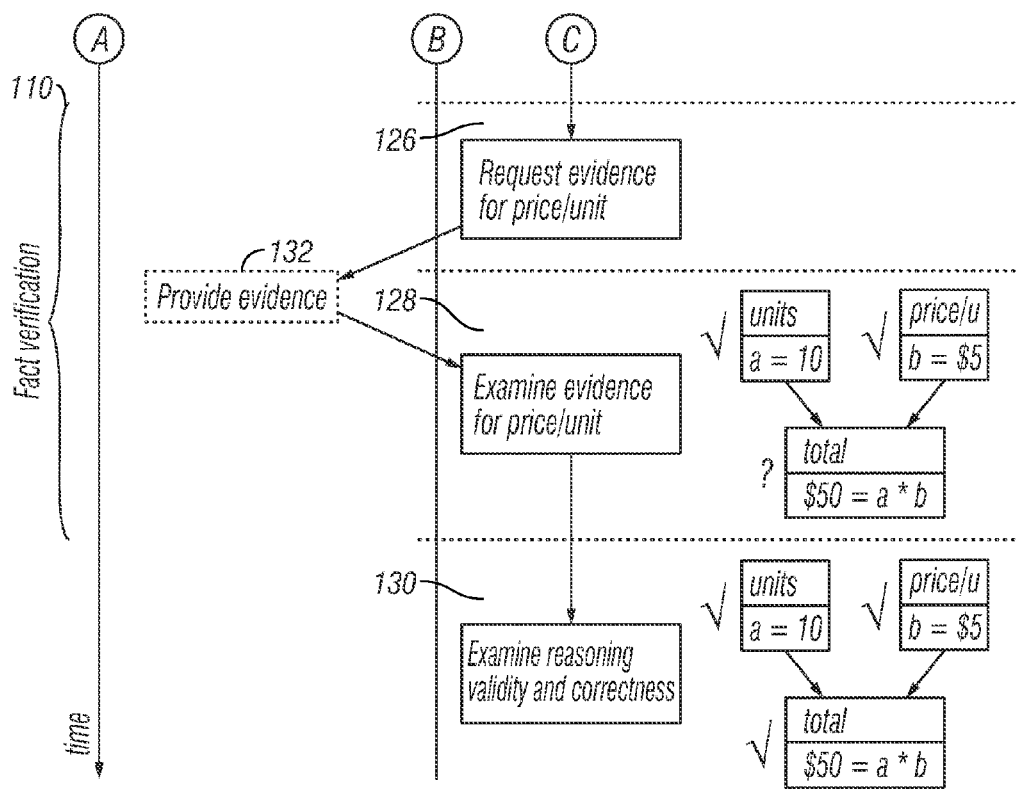

A method and apparatus for certification of facts introduces a fact certifier and a fact certificate into the fact-exchange cycle that enables parties to exchange trustworthy facts. Certification is provided to a fact presenter during the first part of the fact-exchange cycle, and verification is provided to the fact receiver during the last part of the cycle. To request a certification, a fact presenter presents the fact certifier with a fact. In return, the fact certifier issues a fact certificate, after which the fact presenter presents the fact certificate to the fact receiver instead of presenting the fact itself. The fact receiver inspects the received fact certificate in order to evaluate the fact's validity and trustworthiness. For some facts and notions of verification, the fact certificate is sufficient and its inspection does not require any communication. For others, the fact receiver requests a verification service from the fact certifier in order to complete the verification.

4

Facts are pieces of information. In most embodiments herein, facts consist of numerical figures and text, but may also appear as tables, charts, pictures and digital files. A fact can be either:

"An Observed Fact": a truth known by measurement or observation; or

"A Deduced Fact": the result of a valid, reasoned deductive process, based on other previously known "basis" facts.

Examples of observed facts include an amount paid in cash, a credit card swipe, a bank transaction, a security trade, a picture taken by a camera, the presence of a person or an object at a certain place at a certain time, a medical image, a chemical analysis of a substance, a reading of a utility consumption gauge, a reading from a vehicle speedometer, a genetic sequence measured by a sequencing machine, a report by a witness of an incident, a witness by a notary regarding identification of a person at a certain place in a certain time, a report by an appraisal professional regarding the status of an asset, a blood pressure or body temperature measurement, a specific antidote test performed on a blood sample, and so on.

Examples of deduced facts include an arithmetic calculation applied to previously known figures, an algorithm carried out by a computer program applied to previously obtained data, a statistical inference procedure applied to previously known data, application of a decision rule, calculation of tax using a specified set of tax regulations based on previously known income and personal information, and formal medical triage using a specified triage protocol based on patient information.

An observed fact is true if the measurement or observation is true and authentic. A deduced fact is true if its basis facts are valid and if the deductive process is valid and has been performed correctly.

The difference between facts and general pieces of information is that facts are claims about reality. As such, facts have an implicit claim to be valid by virtue of the way they were generated. On a general level, the aim of the method and apparatus described herein is to make this claim explicit and consequently open for inspection and other uses.

Concerns of a Fact Presenter

A fact presenter is interested in presenting a fact to one or more other parties. More specifically, the fact presenter is an individual or an organization with knowledge of either (i) an observed fact known by previously performing a measurement or observation, or (ii) a deduced fact known by previously performing a reasoned deductive process based on other facts. The fact presenter is interested in presenting the fact to one or more verifiers, as part of an engagement with the receiver or receivers. For example, the fact may represent the situation of an asset entrusted by the receiver to the presenter, or form the basis of a financial claim against the receiver, or form a piece of evidence observed and processed by the presenter.

A complication may arise when the fact presenter is interested in presenting a fact while withholding its actual information contents due to privacy concerns. In this case, the presenter is seeking the receiver's trust that the fact is known to the presenter and is valid, while denying the receiver an ability to observe the actual fact. This may arise when the fact discloses a trade secret of the presenter, or may infringe upon the privacy of an involved third party.

Concerns of a Fact Receiver

The fact receiver is interested in evaluating whether facts that were previously presented are valid and trustworthy.

In most embodiments, the fact receiver may be an individual or an organization, who is presented with a fact, and is at some later time asked to cooperate with the fact presenter based on the assumption that the fact is valid. When deciding whether to cooperate as prompted, the fact receiver must either trust the fact validity, or else undertake to validate and verify the fact. Thus, the fact receiver is interested in evaluating the trustworthiness of the fact. Conclusive verification may be challenging when a period of time passes between the moment when the fact was supposedly originally observed or deduced by the fact presenter, and the moment when it is received. Another period of time passes from the moment when the fact is received to the moment when cooperation (and hence verification) is prompted.

Whenever the verification process requires the fact receiver to invest resources, such as time, effort and capital, the fact receiver needs to balance the required resources against the risks incurred by assuming that the fact is valid without undertaking to verify it.

It is useful to decompose the receiver's concern regarding fact validity into three specific concerns. Efficiently satisfying these concerns, while respecting the fact presenter's concerns, serves as the primary goal this invention. The fact receiver is interested in a guarantee that a fact presenter before him is:

Bona fide: Based on bona fide, truthful observations or measurements;

Accurate: Based on accurate records of past observations, and correct application of deductive reasoning procedures; and Transparent: Clearly detailing the complete basis of observations and deductive reasoning procedures, on which it is based.

The first property, that the fact be bona fide, requires that the core pieces of information, on which the fact is directly or indirectly based, were originally provided by observers and measurement devices who were describing the reality, namely, speaking the truth. The second property, that the fact be accurate, requires that the information pieces were correctly recorded and later combined into new pieces of information by deductive reasoning processes. The last property, that the fact be transparent, requires that the deductive reasoning processes which was used would be completely open for inspection of their logical judgmental soundness, and that any unverified assumptions, on which the fact is directly or indirectly based, would be clearly listed.

The Fact-Exchange Cycle

Fact presenter and fact receiver engage in interaction regarding a specific fact. This interaction has a similar structure across domains, such as the ones mentioned in Table 1.

1. The fact is presented by the fact presenter to fact receiver.
2. At any later time, the receiver undertakes to evaluate the fact validity and trustworthiness.

Figure 2:
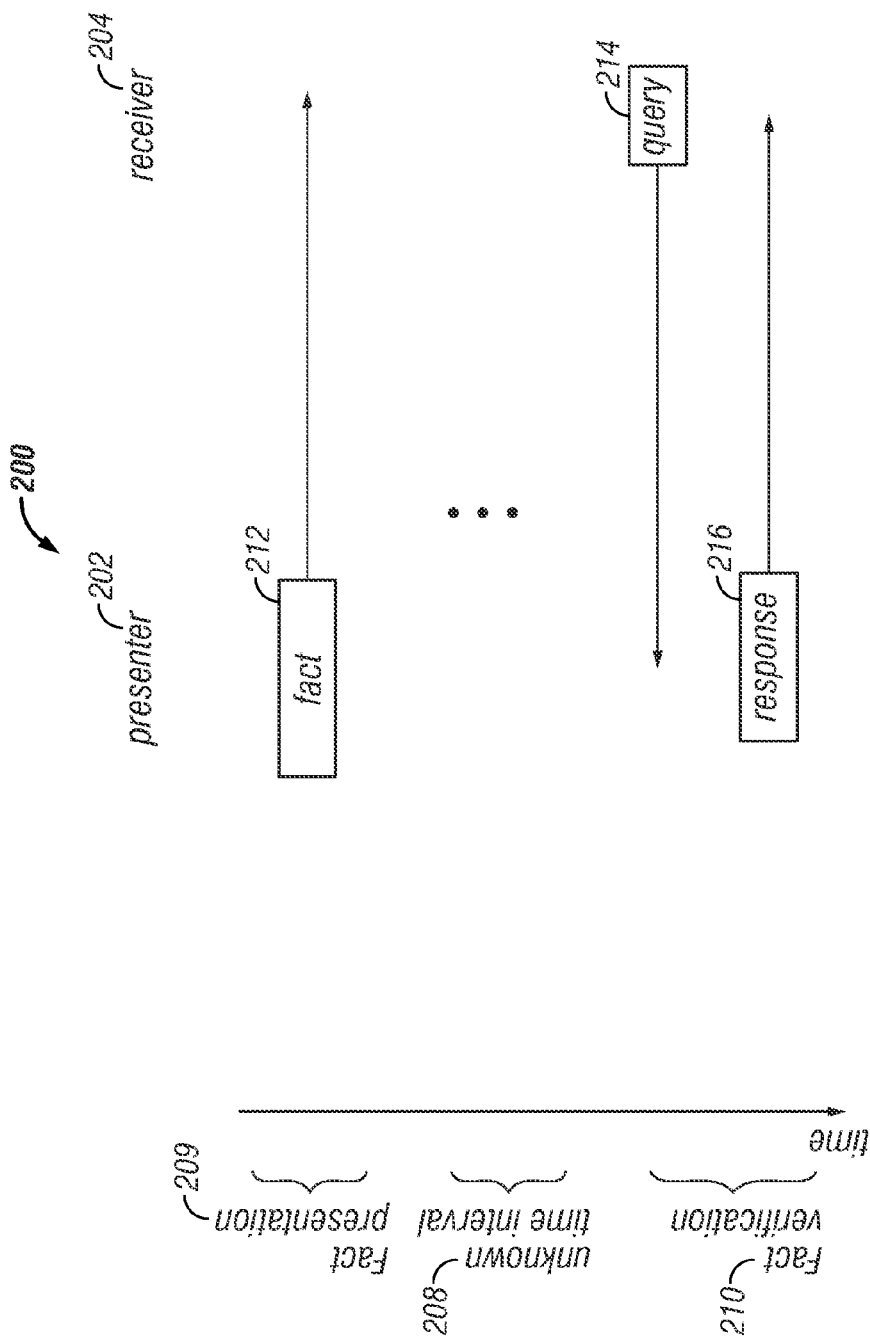
FIG. 2 provides a process chart illustrating a fact-exchange cycle.

These steps are illustrated in a timeline scheme in FIG. 2, showing the three phases of a fact-exchange cycle. In the presentation phase 209, fact presenter 202 communicating a fact 212 to fact receiver 204; in the verification phase 210, taking place after an arbitrary time interval 208, fact receiver 204 communicates to fact presenter 202 a query 214 asking for information needed to verify the fact 212, and receiving a response 216.

To validate the fact, the fact receiver must request additional information from the fact presenter. The manner of this request, as well as the information requested and the manner of the response, varies substantially from situation to situation. The manner by which the first stage is performed determines the information available to the fact receiver, and therefore the eventual complexity of the second stage.

The method and apparatus herein described are founded in notions of fact validity and fact verification, with respect to the novel entities introduced into the fact-exchange cycle: the Certifier and the fact certificate. This description discusses the design and architecture considerations for the Certifier and the fact certificate and their respective ability to fulfill various forms of fact verification. Various examples for both Certifier and fact certificate are given, and the fact-exchange cycle under each embodiment is described.

The currently best understood implementation of each embodiment is described in detail. In addition, several applications are described, each with its choice of architecture. The list of examples of embodiments and applications is by no means exhaustive. Those skilled in the art will appreciate that other embodiments and implementations not included here are possible.

Figure 3:
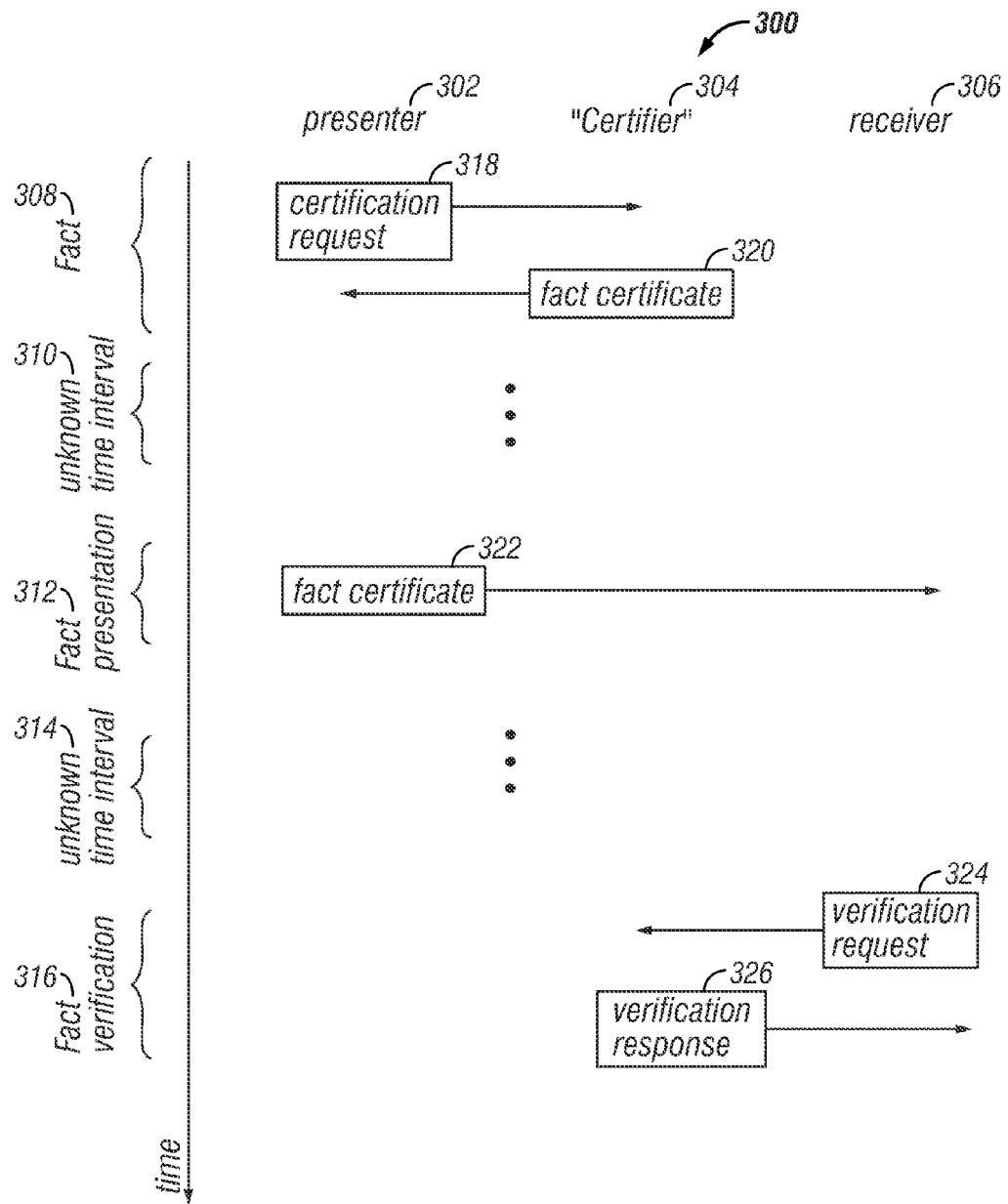
FIG. 3 provides a process chart illustrating a fact-exchange cycle enabled by the system and methods herein described.

The general method by which the Certifier enters the fact-exchange cycle is by providing services to the parties—a certification service provided to the fact presenter during the first part of the fact-exchange cycle, and a verification service provided to the fact receiver during the last part of the cycle as shown in FIG. 3.

The services revolve around a "Fact Certificate" 320, which constitutes a token or a package of information that enables the fact receiver to evaluate a fact's validity and trustworthiness efficiently and conclusively.

FIG. 3 illustrates the basic version of the fact-exchange cycle 300 enabled by the system and methods herein described. In the fact certification phase 308 of the fact-exchange cycle 300, fact presenter 302 requests a certification service 318 from certifier 304. The request 318 contains the necessary details about the fact to be certified. In response, certifier 304 issues and returns a fact certificate 320 to presenter 302. After an arbitrary time internal 310 the fact presentation phase 312 occurs, in which the presenter 302 communicates 322 the fact certificate 320 to the receiver 306. After another arbitrary time interval 314, the verification phase 316 begins, in which the receiver 306 communicates a verification request 324 from the certifier 304, usually by communicating the fact certificate 320. In response, the certifier communicates a verification response 326.

The fact-exchange cycle described herein is fully responsive to the parties' concerns. This improvement is made possible by enabling the fact presenter to create facts that are guaranteed, by virtue of a fact certificate, to be valid and trustworthy. Analogous to an official birth, marriage or education certificate, or to a digital certificate used in secure communication, a fact validity certificate is a document that is meant to be inspected by any party interested in verifying the validity of the certified fact or otherwise evaluating its trustworthiness. Like inspection of birth certificates or digital certificates in secure communication, the inspection of a genuine fact validity certificate is a passive, straightforward process that enables the inspector to conclusively conclude that the certified fact is valid and trustworthy.

Figure 4:
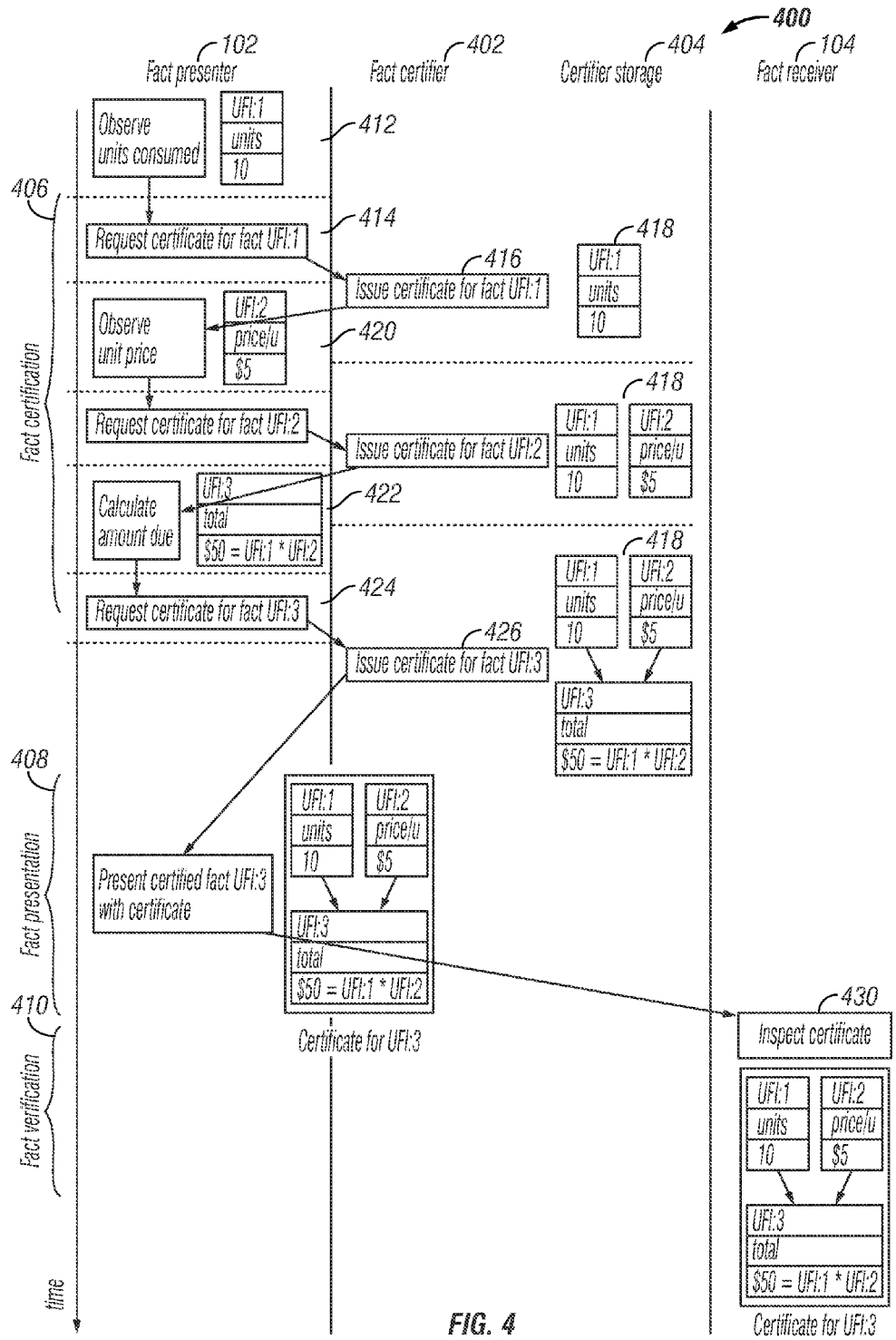
FIG. 4 provides a process chart illustrating a fact communication cycle for a simple bill, enabled by the system and methods herein described.

To make the above abstract exchange cycle more concrete, FIG. 4 provides a process chart illustrating a certified fact-exchange cycle 400 in the simple utility bill example discussed above, showing the fact-exchange cycle enabled by the system and method herein described. At the certification phase 406 of the cycle, fact presenter 102, in this case the utility company, observes a fact 412 regarding units consumed by the receiver 104, in this case the customer. Presenter 102 requests certificate 414 for the observed fact 412 and certifier 402 issues certificate 416 and archives fact in permanent storage 418. A similar process follows for observed fact 420 regarding unit price. Both facts are archived at certifier permanent storage 418 at this point. Presenter 102 then computes the total sum due 422, a deduced fact, and requests certification 424 citing both basis facts 412 and 420 already certified by certifier 402. Certifier 402 issues certificate 426 for total bill. At the presentation phase 408 of the cycle, presenter 102 communicates certificate 428 to receiver 104. At the verification phase of the cycle 410, the receiver 104 inspects certificate 430 to evaluate trustworthiness.

Fact validity certificates are issued based solely on information communicated between the fact presenter and the certifier. Consequently, the validity of certified facts can be verified without need for physical inspection of the presenter's facilities or systems. Fact certificates can be issued for facts whose evidence basis includes information private to the presenter that is available to the certifier only and is withheld from any fact receiver Additionally, fact certificates can be issued—under some restrictions—even for facts whose evidence basis is withheld from any party other than the fact presenter. This includes facts whose evidence basis is withheld from the certifier that issues the fact certificate. When the evidence basis of a fact includes unverifiable assumptions, the validity certificate is issued with a reservation that explicitly lists these unverifiable basis assumptions. Fact certificates are not addressed to a specific fact receiver and may be treated as documents: for example, they may be exchanged, stored, archived and published without harming their usefulness and their function.

The process herein described provides an efficient and practical solution to a variety of problems encountered by individuals and organizations that are required to trust information presented before them when the task of evaluating the trustworthiness of this information is expansive, difficult or simply impossible. This situation is familiar to any recipient of bills, financial statements and reports, bank and credit account statements, insurance claims, scientific reports, medical diagnosis and so on.

Fact certification for deduced facts is based on a method described herein to represent a collection of facts as an interconnected network, where facts are connected if one fact is a basis fact for another. The basic motif of this network is a deduced fact, connected to all its basis facts, which could be other deduced facts or observed facts, as shown in FIG. 5, illustrating a deduced fact 502 and its basis of facts. This generic deduction chart shows the complete basis 500 of observations and deductions underlying a deduced fact 502 that has two basis facts, an observed fact 508 and a deduced fact 510. The deduced fact 510, in turn, is based on two observed facts 512, 514. We say that 502 is indirectly based on facts 512 and 514, and that the complete basis of deduced fact 502 consists of facts 508, 510, 512 and 514.

Various fact networks of this kind form the basic data structure stored in fact certificates and used by certifiers. This network can have significant secondary value independent of the primary motivation of fact verification. Indeed, owing to its highly structured and annotated nature, it constitutes a corpus of information pieces that is amenable to automatic analysis, which is unavailable on an ordinary corpus of information. For example, these certified fact networks might be:

- tagged with semantic tags and then tested to satisfy formal assertions;
- automatically indexed and searched based on their reliance upon a certain evidence or a reasoned deduction procedure;
- used to automatically calculate a hypothesized change to a certified fact, which might be caused as a result of a given change in its basis evidence; or
- processed automatically to agglomerate certified facts into new certified facts according to formal rules.

In an embodiment, the certifier may be a computer-implemented system that includes a permanent storage unit and communicates with the computational agents of fact presenters and fact receivers over a computer network, such as the Internet.

Specific examples of such an embodiment may find application in various domains such as, but not limited to, utility billing, medical billing, finance, banking, accounting and legal procedures. Additional embodiments strike different trade-offs between the fact presenter's privacy on one hand and the conclusiveness of validation enabled by the certificate on the other hand. Embodiments are described that may include methods to present certified facts in media, printed and digital publications in a manner that makes their trustworthiness apparent using a visual emblem that acts as an access key to the fact certificate. Many variations on these embodiments are described in detail, including variations that have different applications, privacy considerations, communication constraints, and surrounding technological context. The subject matter described is shown to be capable of effective implementation in all these settings.

Basic Principles

This disclosure will make it evidently clear that while the situations mentioned in Table 1 belong to very different aspects of modern society, the underlying concerns of fact presenters and fact receivers, and the difficulties they face can be described and treated on a unified, general level.

A system and an associated communication process systematically solves the problem of evaluating fact trustworthiness that arises whenever cooperation between parties calls for exchange of facts.

The method and system include a mechanism for certification of facts. This mechanism, herein identified as a certifier system, acts as an independent agent that communicates with fact presenters and fact verifiers using a communication method of their choice. A fact certificate produced by the certifier system provides the fact receiver with an easy to inspect guarantee that the certified fact is valid and trustworthy.

Any form of information may constitute the facts exchanged, including numbers, words, sentences, documents, tables, charts, images, audio recordings, video recordings, digital data files and digital data streams. Each of the parties exchanging facts may be an individual an organization, such as a company or a government agency.

The communication method used to exchange facts may be based on physical exchange of media and documents, a global computer network such as the Internet, local computer networks, electronic or optical communication lines such as modems, or any form of wireless communication.

The fact certificates issued by the certifier may constitute a physical or a digital document. The fact certificate is made available to the fact presenter by physically attaching the certificate to the certified fact, or by providing means of remote access when the certificate is a digital document. The fact presenter may exhibit the fact certificate alongside the certified fact when presenting the fact to any fact receiver.

The certificate specifies a simple sequence of instructions, which may be given in a natural language or as computer-executable code or program. These instructions are meant to be followed or executed by the fact verifier person or a computational agent acting on behalf of the fact verifier. After following the steps included in a genuine fact certificate, the fact receiver or its computational agent necessarily conclude that the fact is valid and trustworthy.

The fact receiver does not need to inspect the fact certificate upon receiving it, or at any other pre-specified moment, and is able to archive the fact certificate alongside the fact it certifies. At any later time the fact receiver may inspect the fact certificate by following the instructions it provides.

The following summarizes the fundamental principles of the system and method. These principles are guidelines for the design of Certifiers, of fact certificates and of the fact-exchange cycle that they enable. Those of ordinary skill in the art will appreciate that these principles may be implemented in multiple ways.

4.1 Trustworthiness of Observed Facts is Guaranteed by Committing them to a Third Party Upon Observation.

The system and methods are able to guarantee the accuracy of observed facts, namely that they are faithful representations of the report originally made by the observer, and more generally to guarantee their trustworthiness, by communicating the observation to a trusted third party, along with a universal time-stamp, immediately after the observation is made;

4.2 Trustworthiness of Deduced Facts is Guaranteed by Recording the Deduction Process and the Basis Facts.

In current practice, the reasoned deduction process that is used to generate a deduced fact, as well as the basis facts to which the process is applied, are all discarded once the deduced fact is generated. The system and method are able to guarantee the transparency of observed facts, and more generally to guarantee its trustworthiness, by recording this information as the deduction process is being executed, and storing it permanently in structured form.

4.3 Fact Certificate.

The disclosed process enables creation of a specially formatted document or token, containing or giving access to the entire basis of observations and reasoned deductions that lead to a certain fact. This fact certificate offers an easy to check guarantee of the fact trustworthiness.

4.4 Privacy-Respecting Trustworthiness Through Commitment.

When a fact should be communicated to ensure trustworthiness but cannot be disclosed due to the presenter's privacy concerns, the invention enables a secure privacy-respecting commitment. On the one hand, the commitment respects the privacy concerns of the fact presenter. On the other hand, it respects the trustworthiness concerns of the fact receiver, as it can only be fulfilled by the full fact that is being withheld.

4.5 Fact Networks.

The system and method enable the creation of an inter-connected, annotated network of facts, in which facts are connected if one is the basis for the other. This network forms a data structure that allows efficient communication and storage of fact collections. In computer-based implementations, this network can be also used for sophisticated applications that go beyond fact verification.

4.6 Presentation of Facts.

The system and method make it possible to present facts that are obviously and conspicuously valid and trustworthy, and to present facts in software, digital media, printed media and physical media in a manner that necessarily allows the reader to access the entire basis of observations and reasoned deductions that lead to it.

5. Responsiveness to Concerns 5.1 Receiver's Concerns

To describe the exact nature of the system and method's responsiveness to the receiver's concerns, we now analyze what makes each of the two kinds of facts true.

An observed fact is a report or account made by an observer or a measurement device at a specific point in time and recorded for later use. An observed fact is true if:

1. the observed fact is bona fide: At the time the observation was made, the observer made a true account of the reality. Namely, the observer had been speaking the truth; and
2. the observed fact is accurate: the fact as found on record represents an accurate, untampered and unchanged account of the observation originally made by the observer.

Regarding the first item—the assertion that an observed facts is bona fide, auxiliary methods to overlook observers and measurement devices are provided, making it in many ways harder to pass a false observation as bona fide. However, this invention is not intended to guarantee beyond doubt truthfulness of reports made by human observers and measurements devices.

Regarding the second item—the assertion that an observed fact is accurate—a method is provided to guarantee beyond doubt that a certified observed fact represents an accurate, un-tampered and unchanged account of the observation originally made by the observer.

Turning now to deduced facts, a deduced fact is a report stating that a specific deductive reasoning process has been applied to a collection of previously known facts, and has produced the stated result. A deduced fact is true if:

The deduction process is semantically sound and valid in the context in which it is made (for example, it is logically sound, legal, follows standard practice, reasonable in its context, accepted by peers, etc); and The deduced fact is accurate: The process as stated has been applied or executed accurately and correctly to produce the stated result.

Regarding the first item—that the deduction procedure is valid in its context—the transparency of the fact is guaranteed, namely that the reasoned deduction process is fully exposed for inspection. In that, the system and method guarantees that the receiver's agent have all the information needed to decide on the validity of the deduction processes. However, the system and method are not intended to guarantee that they are indeed valid in their context.

Regarding the second item—that the deduction process has been applied correctly—a method is provided to guarantee beyond doubt that the deduction process as stated has been applied accurately and correctly to the stated basis facts.

5.2 Presenter's Privacy Concerns

The system and method are fully responsive to the presenter's concern regarding privacy. Specifically, the fact presenter my present trustworthy facts while withholding private pieces of their underlying information. Flexible design patterns enable creation of certification systems with different trade-offs between the presenter's concern for privacy and the receiver's concerns for trustworthiness, making it possible to apply the invention in many different domains and situations where exchange of facts is involved.

6. Types of Illustration in the Present Description 6.1
Deduction chart of a deduced fact: a structural description of the basis of a deduced fact. In such figures, arrows show which facts are based on other facts;

6.2
Design chart of a fact-exchange system: the various parties in a fact-exchange cycle and the services provided by parties to other parties. In such figures, arrows represent services provided; and 6.3
Process chart of a fact-exchange cycle: the order, timing, and direction of flow of information between parties during the communication process, shown along a time axis. In such figures, the arrows represent flow of information, such as facts presented, requests made and certificates communicated.

7. Example Applications

Below, an embodiment is illustrated using example applications. The following describes many different scenarios where the described system and method are likely to be useful. So as to demonstrate the potential value of the invention in a wide range of scenarios, the following examples were chosen such that in each, the parties' concerns, the technical constraints and the legal constrains are different. Some involve a simple exchange which only includes two parties. Others involve complex interactions, where the complete interaction involves more than two parties, and where the complete interaction requires several facts exchanges by different presenter-receiver pairs from these parties.

7.1 Utility, Inc

This is an example for an application where the invention is likely to be of value in the realm of billing, which was referred to above. In this application, the facts to be certified are bills generated by a fictitious utility company: Utility, Inc. The exposition is kept simple and short by pretending that utility bills are generated based solely on the amount of units consumed and the unit price. The extension to more realistic utility bills will be obvious.

7.1.1 The Parties and their Concerns

The party presenting the bills for payment (hence, the fact presenter) is the company Utility, Inc. The company is interested in presenting easy-to-validate, trustworthy bills to promote customer experience. At the same time, the company is concerned for the privacy and security of the customer's consumption information, which is considered private and confidential.

The party receiving the bills for payment is the customer. The customer is interested in an easy-to-check guarantee that the billed amount is valid. Breaking the bill's validity into its the primary specific receiver concern, the customer is interested in knowing that:

The bill is bone fide, namely based on true and authentic consumption measurement and an authentic quote of unit price; and The bill is accurate, namely the usage and the price faithfully represent the usage and price as originally observed, and the multiplication was performed correctly.

In this application, the deduction process is straightforward so the transparency concern does not play a role.

7.2 Scientific Research Reports

This is an example application where the system and method are likely to be of value in the realm of scientific publication. In this application, the facts to be certified are numerical figures, tables, charts and graphs that summarize the results of a published scientific research. In most scientific fields, research hypotheses are validated based on experiments. The final results of such experiments, published as numerical figures, tables, charts and graphs, prompt action on behalf of publication readers. Based on them, manuscripts are accepted for publication or rejected, funding for scientific projects is awarded, and so on. More importantly, these reports are the process through which knowledge is accumulated. In medical science, clinical trials in human subjects are approved based on these results, and new drugs are approved for use.

These scientific results are extremely complicated deduced facts. The observed facts upon which they are based are measurements made at the laboratory. These measurements are subjected to at least a few layers of processing and statistical analysis, implemented as a computer program, which constitute the deductive reasoning process in this case. The published result is the final product of these procedures.

7.2.1 Concerns of the Research Report Reader

The research report reader is interested in an easy-to-check guarantee that the results reported in a publication are valid. In terms of the three detailed concerns of the fact receiver, this includes:

A guarantee that the results are transparent, namely that the computational process used to generate the result is fully, clearly and unambiguously stated;

A guarantee that the results are accurate in the sense that the computational process was applied correctly as stated; and A guarantee that the observed facts (i.e. the measurements) are accurate in the sense that they were not changed by accident, or deliberately tampered with, since the measurement took place.

These concerns represent a wide array of problems that could potentially invalidate reported research results, such as fraud, usually in the sense of tampering with or altering observation logs after the measurement process was completed, or error, in the sense of applying an invalid deductive process or incorrectly applying a deductive process.

7.2.2 Computational Results and Computer Programs

The facts in this application are scientific computational results, or results for short. There are numerical figures, tables, charts and graphs that summarize the results of a published scientific research. Results are deduced facts.

The following specializes the general terms used herein to the terms particular to the application currently being described:

As with any deduced fact, results are generated by applying a deductive reasoning process to basis facts. The deductive reasoning program in this case constitutes one or more computer programs and scripts. Popular scripting languages for creating computational results include MATLAB, R, PERL, RUBY, and PYTHON. Additionally, there exists a large number of niche scripting languages used in specific research communities and the system described can accommodate these as well.

In the generating program, a result is created by a specific instruction that prints the result, such as a number or a graph, to screen or to file. These programming and scripting languages are based in the procedural programming paradigm, wherein the execution flow of a computer program is organized around invocations of functions. In this context, a function is a segment of code in the programming or scripting language having declared input arguments and output arguments which are variables stored in the computer memory. To invoke a function, an instruction is given to specify the segment of code to be executed, or the function "body", and the location in memory of the values of each of the declared function arguments. In procedural programming, instructions in the function body that are executed as part of a function invocation typically access the input arguments and variables created by other instructions in the function body. Therefore, the function is an atomic deductive reasoning procedure that is applied to a defined set of information pieces.

In these terms:

The computational result is a deduced fact;

The function that included the instruction that creates the result is a deductive procedure; and The input arguments passed to the function are the basis facts.

7.2.3 The Conventional Exchange Cycle

The following outlines the particularities of the conventional fact-exchange cycle for scientific computational results:

Results are produced on the researcher's computer as described above.

In the fact presentation phase, the researcher authors a report article, which describes the research conducted by means of verbal description, equations, and illustrations. The researcher embeds in the article the results—number, graphs, and so on—that summarize the research results. For example, results can include numbers summarizing a statistical analysis applied to empirical data that is used to test the research hypothesis, or graphs providing a visual summary of comparison to prior methods, etc. The report is submitted to a funding agency or submitted for publication in a research journal. The results included in the report are instrumental for readers to evaluate the report's contribution to the art.

In the fact verification phase, the journal editors and referees, or funding agency personnel, or eventually journal readers, are interested in verifying the results, as per the reader's concerns above.

In the conventional fact-exchange cycle, the fact verification phase requires the reader to contact the report author, or if some package of data or code has been made publicly available, to read through the code package.

Several high-impact scandals regarding alleged fraud (for example, the alleged scientific misconduct of Dr. Thereza Imanishi-Kari regarding a report published in 1986 and the alleged scientific misconduct of Dr. Anil Potti in 2006) demonstrate that the current fact-exchange cycle in many scientific fields (notably, life and medical sciences) does not address the reader's concerns well.

7.3 Mortgage-Based Securities

The following is an example application where the system and method is likely to be of value in the realm of financial securitization. In this application, the facts to be certified are valuations of mortgage-based securities (MBS). These securities received widespread attention due to their part in the late-2000's financial crisis in the United States.

The exposition is kept simple by ignoring some of the technical details of the securitization process and instead using a simplified picture. The extension to the full process, as it is practiced in the United States today, will be obvious.

7.3.1 Participants

Unlike other application examples discussed in this disclosure, in this example facts are exchanged between more than two parties. During the interactions, a certain party acts as fact receiver for some fact and as a fact presenter for another fact. In this aspect, this example serves to show how the basic fact-exchange between two parties may serve as a building block to describe complicated interactions.

For the purpose of this simplified discussion, the participants in securitization and trade in a certain mortgage-based security are:

The mortgage bank, or simply "bank": the lender;

The securitization trust: the entity issuing the MBS; and

The investor, buying the MBS.

(Other parties, notably the home owner/debtor can be ignored for the purpose of this simplified discussion.)

7.3.2 Background

For the purpose of this discussion, the securitization process includes one or more of the following steps:

Bank receives asset appraisal from an appraisal professional;

Bank sets loan terms and issues mortgage that is backed by the asset;

Bank sell mortgage to securitization agency;

Securitization trust performs securitization of multiple mortgages and issues MBS;

Securitization trust performs and publishes valuation of the MBS; and

Investor buys security.

The different layers of trade that separate the debtor from the investor lead to a situation where MBS valuations are opaque numbers, whose trustworthiness and validity are almost impossible to evaluate. The purpose of this example will be to demonstrate that the system and methods herein described are able to turn MBS valuations into transparent, and generally trustworthy, facts.

7.4 Facts Exchanged in an MBS Interaction

The primary fact of interest in this example is the valuation of the MBS. The process described below is ultimately concerned with certification of this fact. In this fact exchange, the presenter is the securitization trust and the receiver is the investor. However, this exchange is a part of a more complicated interaction that also includes the bank and the appraisal professional.

Beside the MBS valuation, two more facts are involved: the appraised value of the asset, and the load term (both presented by the bank to the securitization trust).

Figure 6:
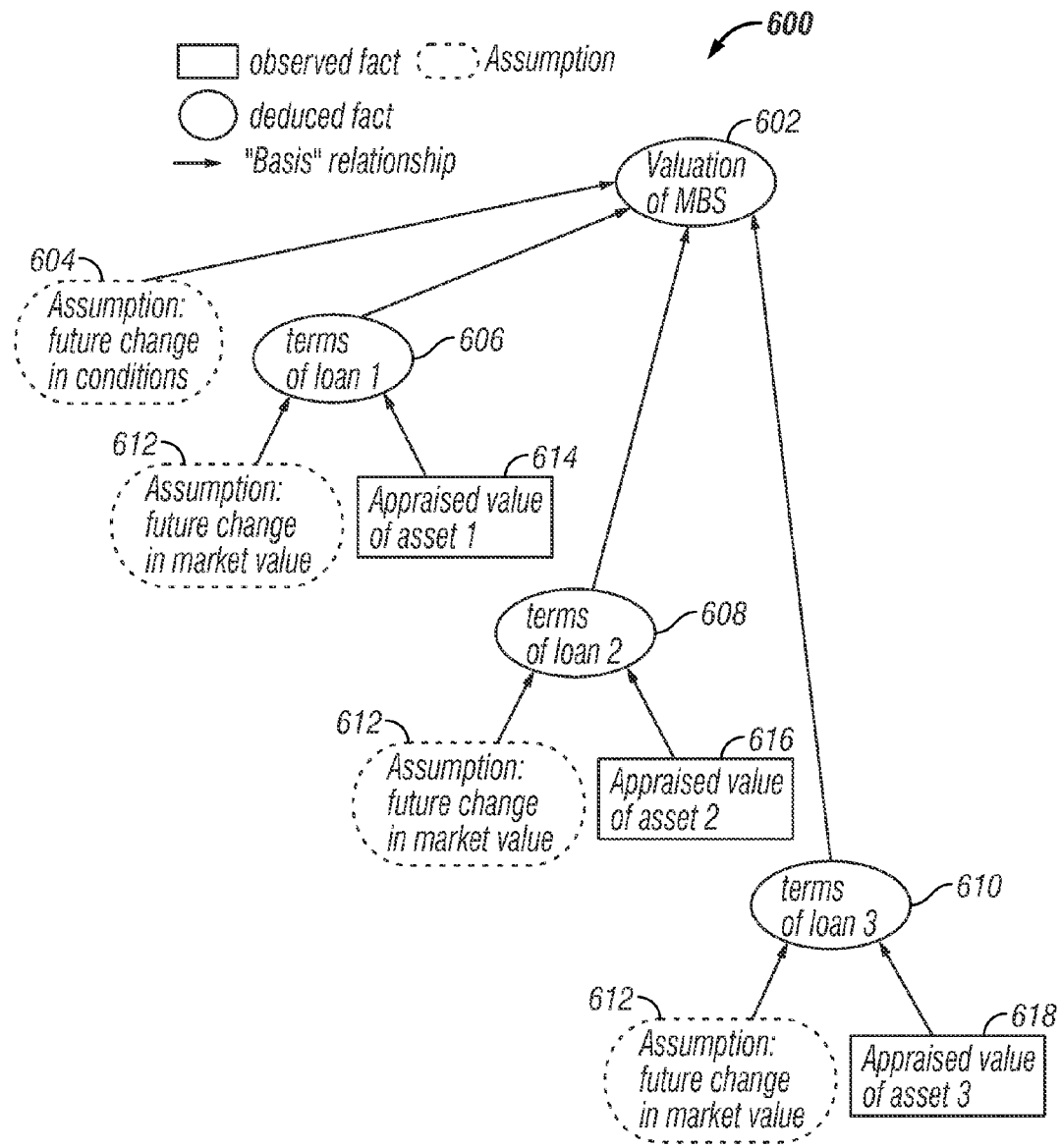
FIG. 6 provides a deduction chart illustrating facts and assumptions involved in valuation of a mortgage-backed security (MBS)

The appraised asset value is an observed fact. The loan term is a deduced fact, which is deduced by the bank. The MBS valuation is a deduced fact, which is deduced by the securitization trust. The structure of these facts is illustrated in FIG. 6. This is a deduction chart 600 showing the complete basis of assumptions, observations and deductions underlying a valuation of an MBS 602 that includes three mortgages. The valuation is a deduced fact based on an assumption 604 regarding future change in housing market conditions, and three deduced facts regarding the terms of each of the three mortgage loans 606, 608, 610. The terms 606 of loan #1 is a deduced fact that is based on an assumption 612 regarding the future change in market value of asset #1, and an observed fact regarding the appraised value of asset #1 614. The deduction structure of terms of loan #2 608 and loan #3 (610) is similar, wherein loan #2's terms are deduced from an assumption 612 regarding the future change in market value of asset #2 and the appraised value 616 of asset #2, and wherein loan #3's terms are deduced from an assumption 612 regarding the future change in market value of asset #3 and the appraised value 618 of asset #3.

The deduction processes involved are arithmetic calculations. The technical details regarding the deductive reasoning processes (whereby loan terms and MBS valuation are deduced from their respective basis facts) need not concern us here. Both loan terms and MBS valuation are based on unverifiable assumptions regarding future market conditions.

7.4 Facts Exchanged in MBS Interaction

The Bank is interested in presenting the securitization trust with easy-to-check guarantees that the appraised value and loan terms presented are trustworthy. On the other hand, the bank is concerned regarding the privacy of its customer (the debtor). While the securitization trust needs to have the full information of the debtor, this information may not be disclosed to third parties such as the investors.

The securitization trust is interested to present the investor with an easy to check guarantee that the MBS valuation is trustworthy. On the other hand, it cannot disclose private debtor information.

The investor is interested in evaluating the trustworthiness and soundness of the MBS valuation. Specifically, the valuation includes a risk component that is derived from the uncertainty regarding future market conditions. In terms of the three specific fact receiver's concerns, the investor is interested in an easy to check guarantee that the valuation is bone-fide (based on authentic measurements), accurate and transparent. The transparency concern is key: the investor is interested to be able to monitor the financial judgment and rationale that lead to security risk rating and MBS valuation, to be able to separate the factual basis for the valuation from the assumptions involved, and to be able to itemize these assumptions.

7.5 Digital Legal Evidence

This is an example of an application where the system and method are likely to be of value in the realm of legal evidence. In this application, the facts to be certified are photographs or short video recordings taken by a person who was an eye witness to an event, such as a traffic accident or a crime. Due to the popularity of mobile phones equipped with cameras, it is common for eye witnesses of an event to take photographs, video recordings or audio recordings of the event, even if the event could not have been anticipated and even if the event caught the eye witness by surprise.

This exposition is kept simple by referring to digital photographs, yet the concerns and the system to address these concerns may be applied to video recordings and audio recordings as well.

For the photograph to be admissible as evidence in a legal procedure, the presenting party needs to prove that the photograph is authentic, namely, that the photograph accurately portrays the scene as viewed by that witness. In digital photography, altering the image in a manner that is hard to detect is possible with household equipment and software. The court decision in the case *Connecticut* v. *Swinton,* 268 Conn. 781 (2004) provides a guideline for ensuring a proper foundation is laid when submitting digital photographs as evidence. The requirements include a proof that proper procedures were followed in connection with the input and output of information, namely, that the photograph as presented is an accurate copy of the photograph as originally recorded by the digital camera. This is to rule out the possibility that the photograph was digitally manipulated between the time when it was taken and the time when it was presented as evidence.

7.5.1 The Parties, and their Concerns

The party presenting a digital photograph as evidence to the court is the eye witness. The witness, or the party summoning the witness, is interested to present an easy to authenticate photograph, and to provide the required proof that it is authentic. The party receiving a digital photograph submitted as evidence is the court. The court (or the opposite party in legal proceedings) is interested to authenticate the photograph against the possibility that it was digitally manipulated between the moment when it was captured on camera and the moment when it is presented in court.

8. Certification of Observed Facts

The present section 8 and section following, section 9, describe the system and method for certification of facts: first observed facts in section 8 and deduced facts in section 9.

8.1 Basic Design

Figure 7:
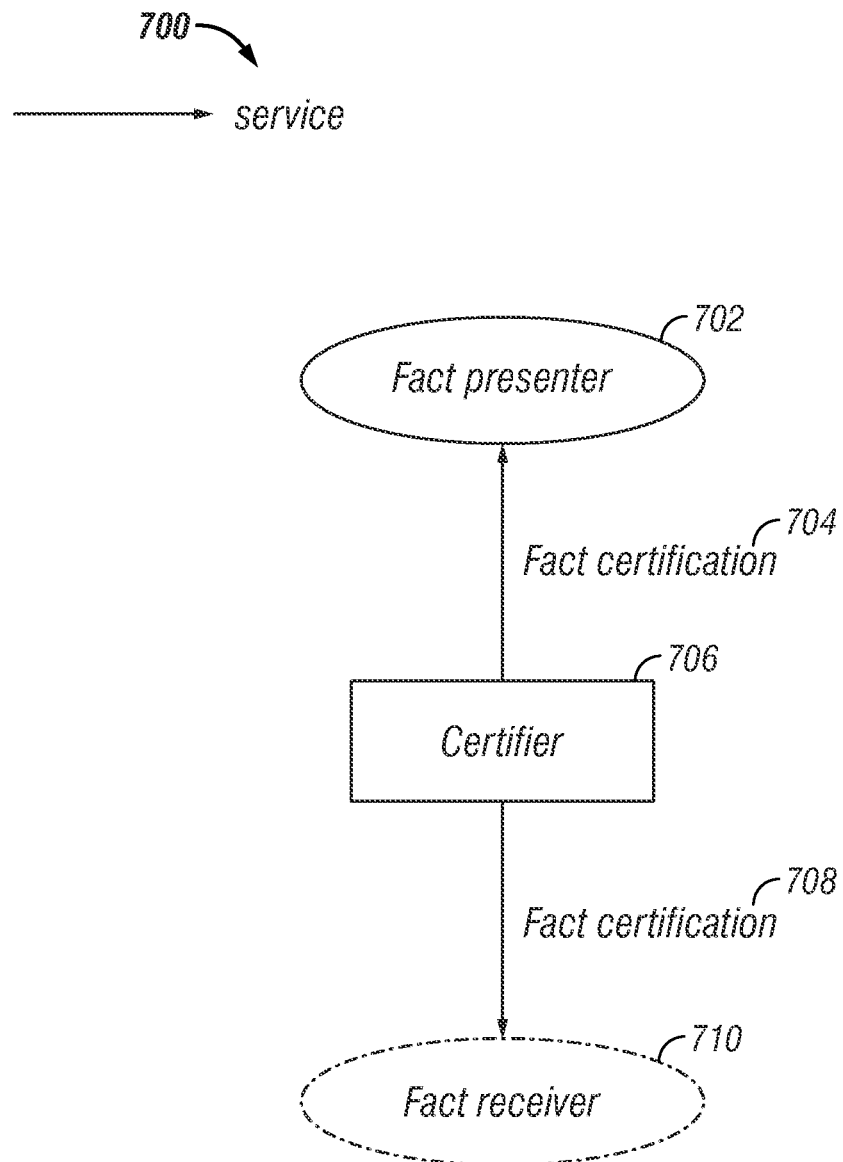
FIG. 7 provides a design chart illustrating a basic design of a certification system for observed facts.

In the basic design of a certification system for observed facts, the Certifier is a system for providing a certification service for the fact presenter and a verification service for the fact receiver as shown in FIG. 7. In the basic design of a certification system 700 for observed facts, shown in FIG. 7, the Certifier 706 is a system providing a certification service 704 for the fact presenter 702 and a verification service 708 for the fact receiver 710.

Any system with at least one of the following abilities can serve as a Certifier:

The ability to generate time-stamps from the universal time;

The ability to store facts permanently and retrieve facts from storage; and

The ability to receive and respond to requests from both a fact presenter and a fact receiver.

8.2 The Basic Certification Process

The two primary concerns of the receiver regarding an observed fact are that the fact be bona-fide and accurate. Recall that an observed fact is accurate if it is a faithful, un-tampered and unchanged account of the observation originally made by the observer. According to the invention principles, the presenter guarantees that an observed fact is accurate by committing it to a third party upon observation.

As previously described herein above, FIG. 3 illustrates a basic certification process for observed facts, wherein:

8.2.1 Fact Certification Phase 308

3. Fact presenter 302 communicates a certification request 318 to the Certifier 304. The request includes observed fact to be certified and the universal time of observation.
4. Certifier 304 checks that the request was received virtually immediately (where the exact meaning depends on context) after stated observation time.
5. If certification is granted:
6. Certifier 304 issues a fact certificate 320 and stores it in permanent storage.
7. Certifier 304 returns the fact certificate 320 to the fact presenter 302.

8.2.2 Fact Presentation Phase 312

The fact presenter 302 can store the fact certificate 320 for any period of time before presenting the fact. To present the fact, the fact presenter 302 communicates the fact and the fact certificate 320 to the fact receiver 306.

8.2.3 Fact Verification Phase 316

The fact receiver 306 can store the fact certificate 320 for any period of time before attempting to verify it. To verify the certified fact—

1. Fact receiver 306 communicates a verification request 324 to the Certifier 304. The request 324 includes the fact certificate 320 received;
2. Certifier 304 checks the permanent storage for existence of the fact certificate 320 included in the request 324 and responds accordingly 326.

8.3 Design Patterns

The following discusses examples of design patterns that may be used to extend the basic design of a certification system for observed facts. These example design patterns demonstrate how the basic design may be adapted to various concerns the parties may have and to different situations encountered in practice, including situations where:

1. Certifier has storage and/or communication constraints and is not able to store or communicate data-massive facts;
2. Communication between fact presenter and Certifier is only possible in the unilateral direction from fact presenter to Certifier (e.g. broadcasts by fact presenter);
3. Fact presenter has a privacy concern and is not willing to disclose observed fact to fact receiver;
4. Fact presenter has a strict privacy concern and is not willing to disclose observed fact even to Certifier;
5. Fact receiver does not trust the Certifier;
6. Fact presenter or fact receiver are concerned about the catastrophic implications of physical damage to the Certifier;
7. Fact receiver is concerned about the exact source of the observation; and
8. Fact receiver is concerned about the observation being bone fide, namely whether the observation is a true report.

8.3.1 "Digest Certificate" Pattern

Figure 8:
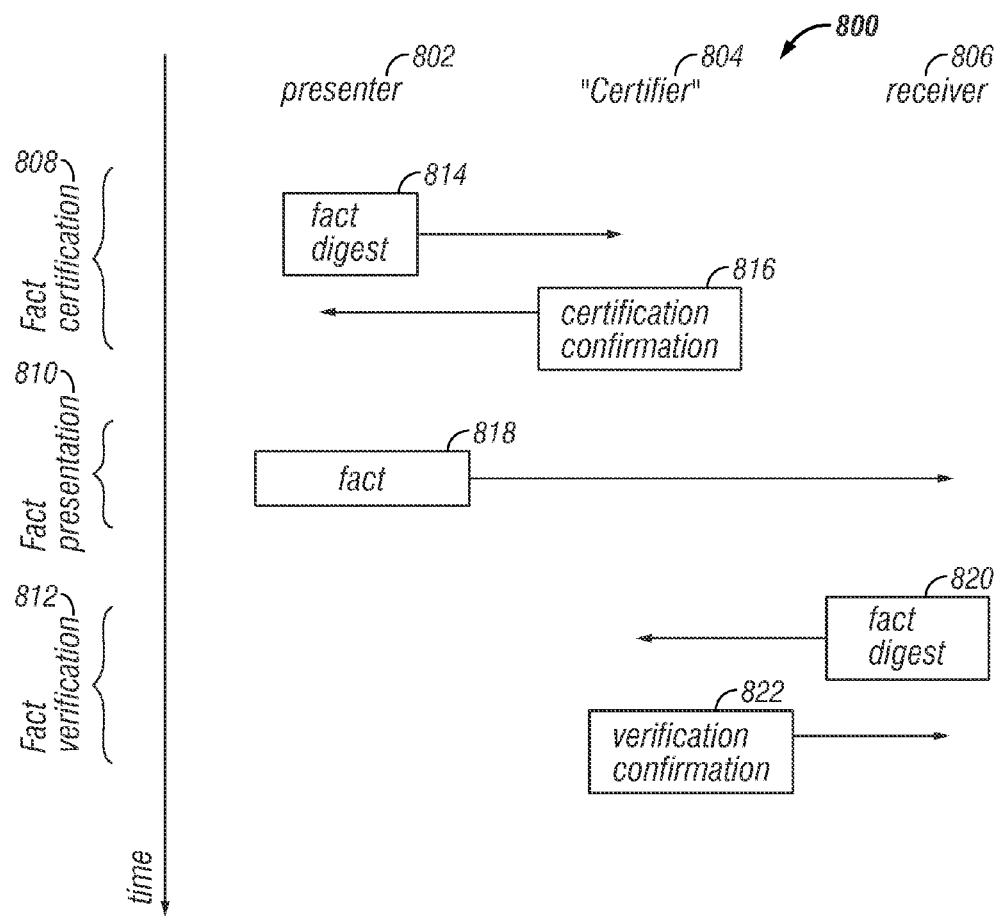
FIG. 8 provides a process chart illustrating a "Digest Certificate" pattern for certification of observed facts.

When the observed fact is in the form of digital information, this pattern, shown in FIG. 8, specializes the basic design and specifies that the fact certificate is a cryptographically secure digest of the observed information. The certifier permanent storage thus only needs to be able to store digests. In the certification process, the fact presenter includes the digest in the certification request and the fact receiver only needs to confirm receipt. Having received the fact, to request verification, the fact receiver only needs to include the digest in the request. Since for secure hashing algorithms, it is practically impossible to create a fact with a given digest, the fact receiver's primary concern for accuracy is satisfied. In addition—

As the certifier is only required to handle a small amount of information when handling requests from both parties, concern above is satisfied; and As the certifier does not need to be able to respond to certification requests, concern above is satisfied.

The certification process 800 for an observed fact using a digest of the certificate instead of the fact certificate proceeds as follows. In the fact certification stage 808, Presenter 802 knows a fact 818 but only communicates fact digest 814 to certifier 804 with the certification request. Certifier 804 communicates a response 816 confirming receipt of the digest. In the fact presentation stage 810, presenter 802 communicates full fact 818 to receiver 806. In the verification stage 812, receiver 806 calculates the digest 820 and communicates it to the certifier 804 as a verification request. Certifier 804 checks storage and responds with a verification confirmation 822.

8.3.2 "Fact Affidavit with a Trusted Certifier" Pattern

This pattern specializes the basic design and enables the fact receiver to trust an observed fact that is not disclosed to him. This is useful when the fact presenter has a privacy concern and is not willing to disclose observed fact to the fact receiver. This pattern specifies that the fact presenter includes the full fact in the certification request communicated to the Certifier, who then stores the full fact in the permanent storage. To present the fact, the fact presenter only present a cryptographically secure digest of the fact to the fact receiver, which is adequately termed a "Fact Affidavit". If the secure digest is used concern 3 is satisfied. To verify the fact, the fact receiver includes the digest in the verification request. The response confirms that the full fact cannot be disclosed but is on file. The parties agree beforehand on extreme conditions, such as court subpoena, under which the Certifier would be allowed to reveal the full fact to the fact receiver. Alternatively, when the interaction includes a large number of private facts, the parties agree beforehand that the fact receiver will be able to choose a small number of facts, the choice of which is unknown to the fact presenter beforehand, which would be revealed to him by the certifier upon making the appropriate "strong certification request". The fact receiver's concern for trustworthiness is satisfied.

Figure 9:
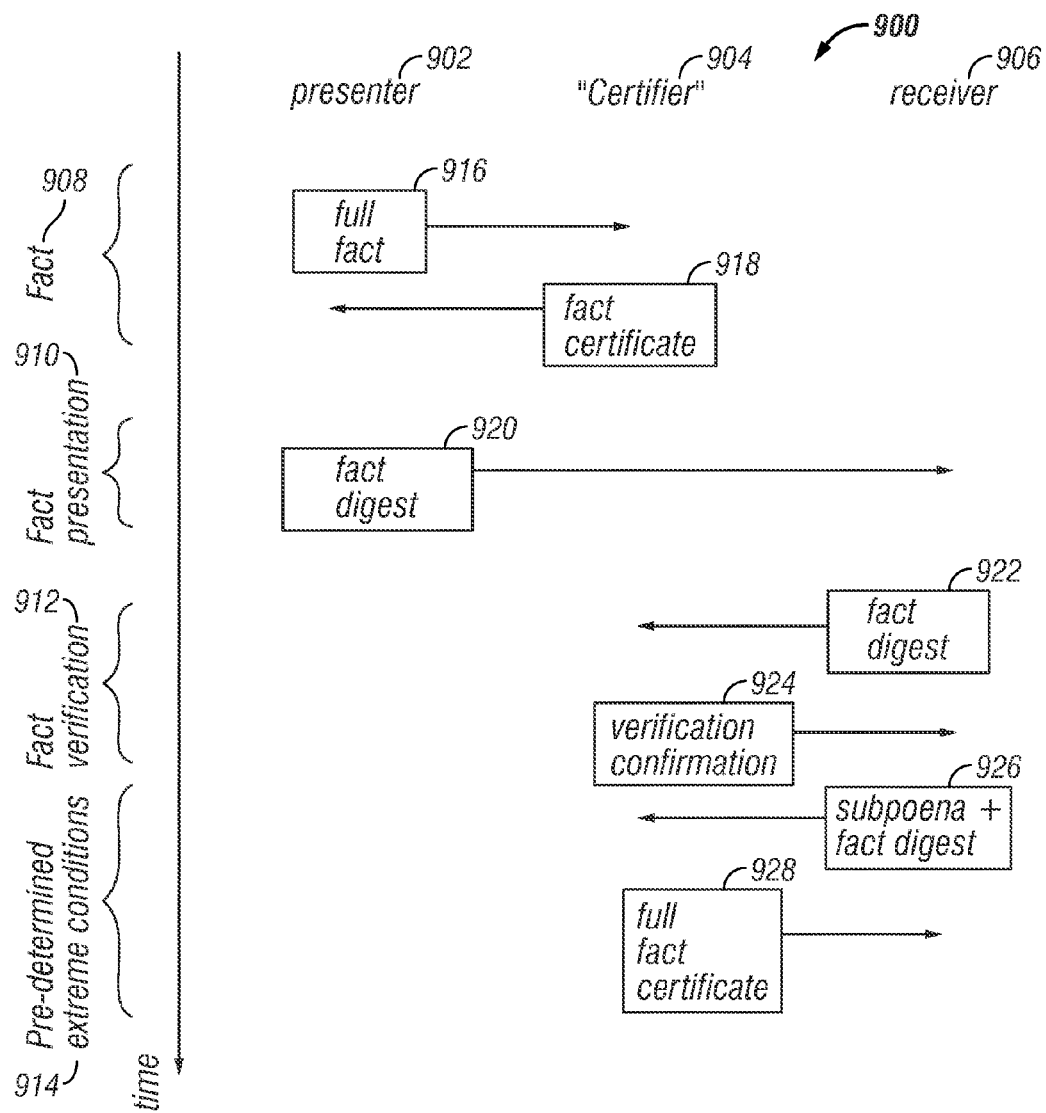
FIG. 9 provides a process chart illustrating a "Fact Affidavit with a Trusted Certifier" pattern for certification of observed facts.

FIG. 9 illustrates the fact-exchange cycle 900 for an observed fact under this pattern. In the certification phase 908, Presenter 902 presents full fact 916 for certification by certifier 904. Certifier 904 replies with a fact certificate 918. In the fact presentation phase 910 presenter 902 presents a digest 920 of the certificate 918 to receiver 906. In the verification phase 912, receiver 906 communicates digest 922 to certifier 904 and receives verification confirmation 924. Under agreed conditions 914 such as a court subpoena, receiver 906 communicates subpoena 926 and digest 922 to certifier 904, who in turn responds with the full fact 916 or certificate 918.

8.3.3 "Witness" Pattern

This pattern specializes the basic design and enables the receiver to trust an observed fact even while not trusting the certifier who produced that fact certificate. This pattern, shown in FIG. 10, allows multiple Certifiers to be included in the fact-exchange cycle. The Certifier to whom the presenter directs his certification request is referred to as the Certifier, while the other certifiers are called "witnesses". A witness is a certifier system as prescribed above with the ability to generate universal time-stamps, access permanent storage and communicate with other parties, specifically with the Certifier and the fact receiver. Like the main Certifier, a witness provides the fact receiver with a verification service. In this pattern, the Certifier maintains a registry of witnesses and allows any witness interested to register in a preliminary process. Witnesses may request to be notified of all observed facts certified by the Certifier, or may be able to specify a filter or a condition that will trigger notification. In this pattern, when the Certifier issues a fact certificate, it notifies all registered witnesses who have expressed interest in being notified about the certified fact. The notification includes only a digest of the fact so communication is not overloaded and privacy is not compromised. In the fact certificate issued, the Certifier includes a list of all notified witnesses. Any witnesses, upon receiving a notification, add a universal time-stamp and store the digest its permanent storage. In this pattern, in the verification stage the Certifier includes in its response a list of witnesses who have witness the certificate issuance. If the receiver does not trust the Certifier, but does trust any of the witnesses specified on the fact certificate, it can make a verification request to that witness. This accommodates the concern above.

Figure 10:
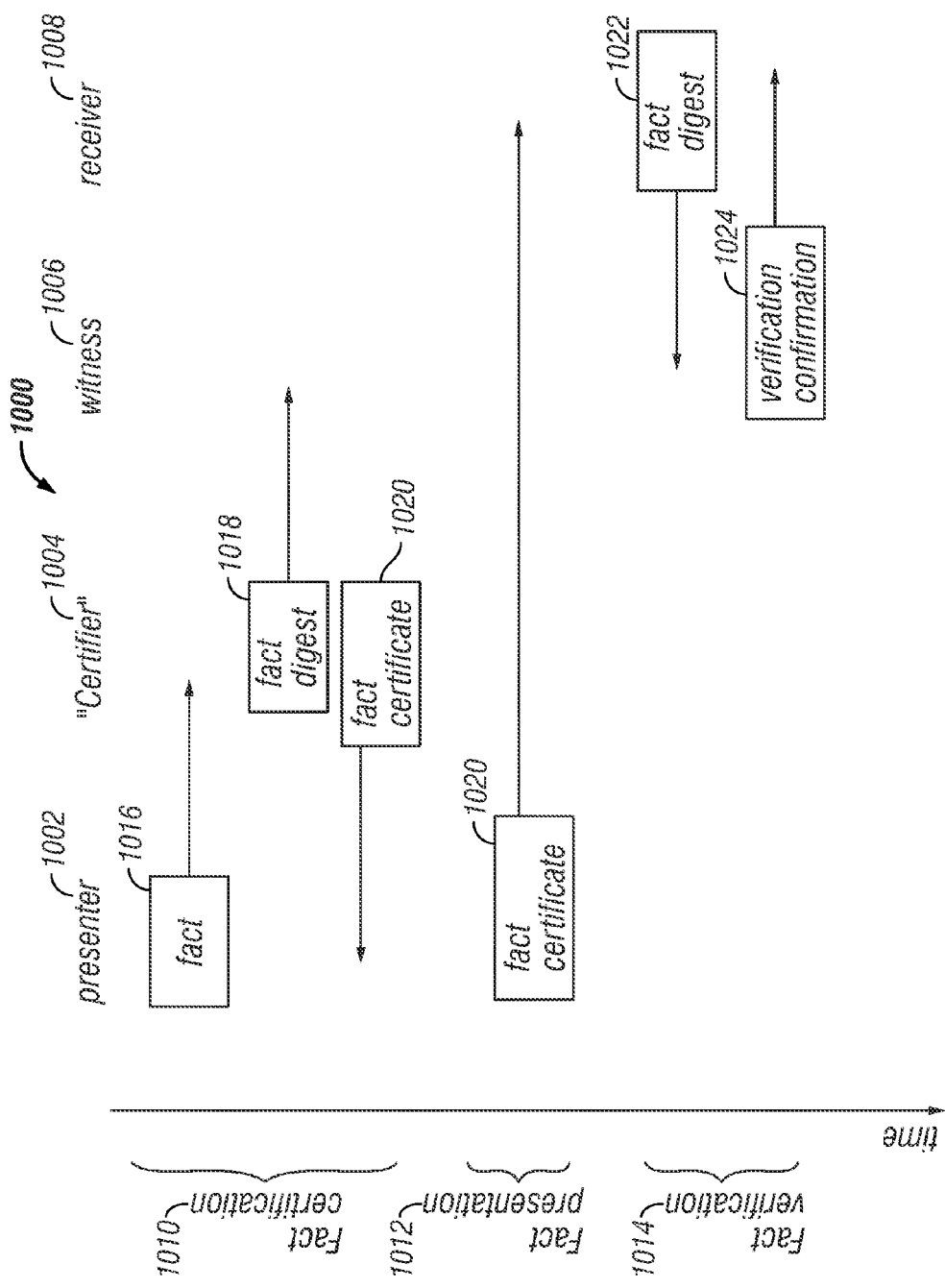
FIG. 10 provides a process chart illustrating a "Witness" pattern for certification of observed facts.

FIG. 10 illustrates the fact-exchange cycle 1000 for an observed fact with this pattern. In the certification phase 1010, presenter 1002 presents fact 1016 for certification by certifier 1004. Certifier 1004 responds to presenter 1002 with a fact certificate 1020 and simultaneously communicates digest 1018 of the certificate to witness 1006. In the fact presentation phase 1012, presenter 1002 presents fact certificate 1020 to receiver 1008. In the fact verification phase 1014, receiver 1008 calculates digest 1022 and communicates digest 1022 to witness 1006 as part of a verification request. Witness responds with verification confirmation 1024.

8.3.4 Certification of Observed Facts: "Public Witness" Pattern

This pattern specializes the "witness" pattern above. The public witness pattern is aimed to address situations where the final receivers of the fact being certified are not known in advance, but on the other hand, may not trust the fact certifier.

In this pattern the certifier allows anyone to register as a witness, even without credentials. These witnesses, in turn, register other witnesses and so on. Upon certification of an observed fact, the certifier communicates a secure digest of the fact to all registered witnesses, who then communicate it further. This effectively broadcasts a time-stamped secure digest of the fact to a network of witnesses. When a receiver, whose identity may not be known at the certification phase, is presented with the observed fact, he may search the witness network to find a witness he trusts, and direct a verification request at that witness as above. This pattern is well suited to an embodiment in a large computer network, where many computers act as Certifiers for multiple concurrent fact exchanges in multiple presenter-receiver interactions. In addition, this design pattern allows these certifier machines to share digests of certificates they issue between them, possibly making any individual machine redundant and satisfying the concern above.

8.3.5 "Observer" Pattern

This pattern specializes the basic design and enables the presenter to provide specific and precise information about the source of the observed facts presented. This pattern allows another party, an "observer", which is acting as fact presenter, to be included in the fact-exchange cycle of an observed fact. An observer is a person or measurement device, operating on behalf of a fact presenter, which observes and reports a piece of information that becomes the observed fact. By including the observer as a party in the cycle, it is possible to monitor the observer closely and to allow it to present, with the observed fact, evidence that support its authenticity.

In this pattern, the certifier offers an additional service—registration of trusted observers. This registration is a preliminary process and should be completed before the observation takes place. The certifier maintains an internal database of registered observers. During registration, the observer may be inspected (physically if necessary) by the certifier, is assigned a unique observer id for internal use of the certifier, and is given a secret token that allows it to proof its identity when presenting information.

In this pattern, the observer can present an observed fact for certification on behalf of the fact presenter, using its assigned identifier and token for identification, or alternatively, the presenter can submit the observed fact and cite the identifier of the observer as the source of information.

This pattern also allows the observer to submit, as an attachment to the observed fact, a piece of information referred to as "evidence". This piece of information is intended to provide evidence that the observation was bona-fide. Evidence can be a photograph, or a signature of a person who took part in the event observed, or any form of digital file.

This pattern can accommodate concerns as above since the source of the information is uniquely identified. The certifier may limit the duration of registration and require an inspection of the observer in order to register again. This enforces a period check of the person or device actually making the measurements and can later allow the receiver to track down the information to the very device that recorded it.

8.4 Responsiveness to Concerns

It will be appreciated that, by aggregating and combining patterns such as the patterns discussed above and other possible patterns, a fact certification process for observed facts can be implemented, which is fully responsive to the presenter's concerns regarding privacy and to the receiver's concerns regarding the fact being accurate and bone fide. As demonstrated, even extreme situations where no individual certifier enjoys both parties' trust can be accommodated.

8.5 Exemplary Embodiment

An embodiment of the certification system for observed facts includes a collection of different interacting components, carefully designed to meet the primary parties' concerns well as other's special concerns such as the ones mentioned above. The flexibility of the embodiment described here to implement the patterns above in order to offer specially-tailored systems for many different situations illustrates the potential of the invention.

In an embodiment, facts consist of any form of digital information (such as double-precision numbers, text files, images, tables, documents, etc.) produced by the presenter's software. The Certifier is a computer-implemented system that includes a permanent storage unit and communicates with the computational agents of fact presenters and fact receivers over the Internet or a similar TCP/IP local network.

The following describes the key participants in the fact-exchange cycle enabled by the invention, the key components of the certification system for observed facts, as well as other major implementation choices, in what is currently regarded as the best mode of implementing the system and methods herein described for the exemplary applications.

8.5.1 Universal Time-Stamp

To communicate Universal time-stamps, the Coordinated Universal Time (UTC) is used, as defined in the Time Protocol (IETF (Internet Engineering Task Force) RFC-868), formatted as a string according to the ISO 8601 standard. All components Synchronize their internal clocks periodically with the UTC by contacting an NTP (network time protocol) server using Network Time Protocol (IETF RFC-1305), e.g. from the National Institute of Standards and Technology (NIST) time servers.

8.5.2 Fact

In an embodiment, a fact is any piece of digital information whose validity and trustworthiness may be of question. The available types of facts are described using Internet Media Types (formerly known as MIME types). This includes, notably:

Data:
 text/plain;
 text/csv: Comma-separated values (IETF RFC 4180);
 application/json: JavaScript Object Notation (IETF RFC 4627);
 text/xml: Extensible Markup Language (IETF RFC 3023); and
 application/x-hdf: Hierarchical Data Format.
Documents:
 application/pdf: Portable Document Format (IETF RFC 3778);
 text/html: HTML (IETF RFC 2854; and
 application/msword: Microsoft Word format.
Audio:
 audio/mpeg: MP3 or other MPEG audio (IETF RFC 3003).
Image:
 image/gif: GIF image (IETF RFC 2045 and 2046); and
 image/jpeg: JPEG image (IETF RFC 2045 and 2046).
Video:
 video/mpeg: MPEG-1 video (IETF RFC 2045 and 2046).
 video/mp4: MP4 video (IETF RFC 4337).
 Any other digital format
 application/octet-stream: Arbitrary binary data.

8.5.3 Fact Digest

A cryptographically secure fact digest is calculated by applying a Secure Hash Algorithm SHA-1 (IETF RFC 3174) or more advanced versions, collectively known as SHA-2, to the observed information, concatenated with a standard ASCII representation of the universal time stated by the fact presenter. For example, when using SHA-1, the fact digest of the fact with text value "37 [C]" and reported universal observation time "2012-02-16T01:44Z" is 3499c544df1ad0b97250980918be4bcdf791e07d.

8.5.4 Certifier Unique Identifier and Address

As discussed below, a Certifier is implemented as an HTTP server. Thus a Certifier is uniquely identified by an Internet Uniform Resource Locator (URL), for example: https://certifier.3rd-party.com or https://www.bigcorp.com/certifier.

8.5.5 Universal Fact Identifier (UFI)

It is convenient to use, for a universal identifier of a certified fact, the concatenation of the Certifier, "/", and the fact digest string. For example, if the certificate of the fact with digest 3499c544df1ad0b97250980918be4bcdf791e07d was issued by the Certifier certifier.bigcorp.com/public, then the fact's UFI would be certifier.bigcorp.com/public/3499c544df1ad0b97250980918be4bcdf791e07d.

8.5.6 Certifier

In an embodiment, a Certifier is a web server communicating with the parties over Hypertext Transfer Protocols (HTTP) or HTTPS protocols. The implementation as a web server is well suited to the role of the Certifier as certification and verification service provider. Indeed, the Certifier web server listens for incoming connections. A natural choice for implementing the certification service would be by receiving an HTTP POST request to the Certifier's URL request, with the certificate (in MIME format, as above) of the fact whose certification is desired. Similarly, a natural choice for implementing the verification service would be by an HTTP GET request. Confirmation or error in both cases is acknowledged by the Certifier using standard HTTP server response codes (e.g. 200 OK for a successful request).

8.5.7 Fact Presenter

A fact presenter is a computational agent, acting on behalf of a person or an organization, which generates a fact (either by allowing a user to report an observation by a user interface or by making a digital measurement). The presenter computer communicates with the Certifier and other parties over Hypertext Transfer Protocol (HTTP) or secure HTTP.

8.5.8 Observer

It is convenient to employ the "Observer" design pattern and to distinguish between the fact presenter, which is usually an individual or an organization, and the actual person or device reporting the observation. In practice, an observer may be an individual person, a computer witnessing an electronic transaction, a machine witnessing a physical event, a machine with a user interface receiving user input, a member of a network witnessing network traffic, a camera, a mobile phone, a GPS device, a measurement device (such as a chemical compound analyzer, a scale, a gas pump), a cash register, a vehicle speedometer, a sensor, a medical imaging device, a DNA sequencing device, a DNA microarray analyzer, a credit card swipe device, a door activation access control unit, a garage gate activation unit, a traffic-light-activation sensor, a thermometer, a web server, a stock broker, a medical doctor, an appraisal professional, a land surveyor, a distance measurement device, an optical barcode scanner, a radar, an audio recorder, a telephone switch unit, an automatic vendor unit, etc.

In an implementation, measurement devices are able to register with a Certifier and communicate directly with the Certifier over a network connection. For example, measurement devices are equipped with a single-board computer (SBC) with a network connection. Alternatively, measurement devices can store measurements on an internal storage unit which is then transferred to a different computer and communicated to the Certifier.

8.5.9 Registered Observer Identifier

The "Observer" pattern specifies that observers are registered with a Certifier as a preliminary step, ahead of reporting any observations. Upon registration, the registering Certifier internally assigns an unique identifier to the registering observer. Externally (notably, in fact certificates) the registered observer is identified by the internal identifier, followed by the @ sign, and the URL of the Certifier, with the scheme omitted. For example, credit-swipe-99281@www.bigcorp.com/certifier identifies an observer credit-swipe-99281 registered with the Certifier www.bigcorp.com/certifier.

8.5.10 Fact Certificate

In an embodiment, a fact certificate is a specially formatted ASCII file built using the MIME format (IETF RFC 2045, 2046 and 2048). Specifically, it is a multipart MIME form with a header and two main parts. The header includes the universal fact identifier in the form discussed above, in the MIME field "Content-ID". The first part is a Java Script Object Notation (JSON) object providing meta-information about the fact. The second part is any MIME type (commonly, of the types above) and contains the fact information itself.

Here is an example for a fact certificate of an observed fact, which is an image:

```
{
MIME-Version: 1.0
Content-Type: multipart/mixed; boundary=
FACT-CERTIFICATE-BOUNDRY
Countent-ID:
<www.bigcorp.com/certifier/
5440118b9d473998df57e02dfe2b7d6aa09353cf>
--FACT-CERTIFICATE-BOUNDRY--
Content-Type: application/json
{
"certifier":"https://www.bigcorp.com/certifier",
"observer-id":"security-camera-188@www.bigcorp.com/certifier",
"observation-time":"2012-02-16T01:44Z",
}
--FACT-CERTIFICATE-BOUNDRY--
Content-Type: image/jpeg
.. image data ..
--FACT-CERTIFICATE-BOUNDRY--
}
```

8.5.11 Certification of Observed Facts: Secure Communication and Proof of Identity Owing to the tremendous importance of public networks, notably the Internet, in implementing the embodiment discussed and other presently valuable embodiments of the system and method disclosed, an implementation of the certification system which also addresses fundamental privacy and security concerns in the network communication level is of great significance. The mechanism by which the certification system is extended to employ secure and private network communications is an important embodiment of the system and methods herein described. The following briefly reviews an implementation that is consistent with current security and privacy standards in Internet communications. Identity of the parties involved may be established using a standard mechanism of digital certificates issued by an established certificate authority as specified by the Transport Layer Security (TSL) protocol, (IETF RFC 5246). The same protocol is used to ensure communication privacy against eavesdropping of and tampering with communications. Message integrity may be ensured by a standard digital signature mechanism compatible with guidelines found in Title 21 CFR Part 11 of the Code of Federal Regulations.

8.6 Example Application Continued: Utility, Inc

As an example for the implementation of the embodiment discussed, we return to the application example of Utility, Inc. discussed above. This part of the application example illustrates how several design patterns discussed may be combined to produce a design that addresses concerns common in billing applications, and how this design is implemented.

Figure 11:
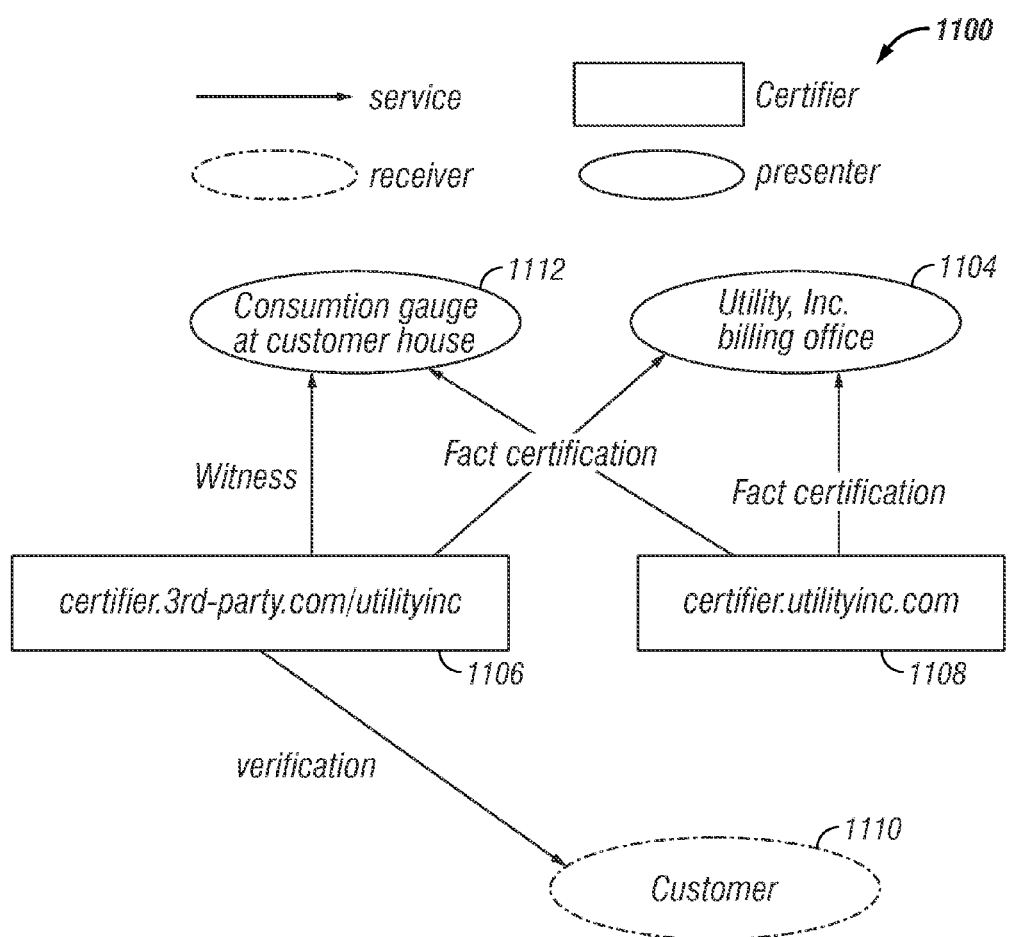
FIG. 11 provides a design chart illustrating a certification system in the Utility, Inc. billing example application.

FIG. 11 describes the design of a certification system for bills 1100 presented by Utility, Inc. The gauge 1112 installed at the customer premises is an observer. The Billing office 1104 of the utility company is another observer. Two certifier servers, a third party certifier 1106 and the utility company certifier 1108, provide certification service to both observers. The third party certifier server 1106 provides witness service to the customer 1110, who is the fact receiver.

The following describes the system components that relate to the certification of observed facts in this application, namely, the unit price and the monthly usage.

8.6.1 Smart Consumption Gauge

The "Observer" design pattern is used to separate the fact presenter (the company) from each individual consumption gauge. The consumption gauge can connect to the Internet via a wireless connection using an embedded single-board computer with a wireless network adapter.

8.6.2 Certifier System: Operated by Utility, Inc

The Certifier computer may be a web server owned and operated by the utility company itself, at, for example, https://certifier.utilityinc.com.

8.6.3 Witness System: Operated by 3rd-party.com

This application may be tasked with addressing two seemingly contradictory concerns. First, the customer does not trust the Certifier operated by the utility company itself and would like the usage observed fact to be certified by a third party Certifier that is controlled by a regulating agency or any other impartial third party. Second, the company cannot expose the private usage information to anyone other than the company and the customer. To address both concerns, a combination of the "Witness" and the "Affidavit" is employed in the following design.

The third party witness is a web server with an URL, say, https://certifier.3rd-party.com/utilityinc. This witness maintains a registry of observers dedicated to consumption gauges. Each customer consumption gauge registers with the 3rd-party Certifier after manual inspection by a technician appointed by the organization running the 3rd-party Certifier. The registration is time-limited, which mandates periodic inspections by the 3rd-party technician.

When periodically presenting a fact regarding a current gauge reading, the smart consumption gauge send the full fact to https://certifier.utilityinc.com and a digest of the fact to https://certifier.3rd-party.com/utilityinc, where it is a registered observer. This way, when wishing to validate the usage fact, the customer's computer can make a verification request to the 3rd-party Certifier by calculating and submitting a digest. To produce the bill, the company's Certifier has the usage information. Everybody's concerns are satisfied.

An example certificate communicated from the gauge to the company Certifier might look as follows:

```
{
MIME-Version: 1.0
Content-Type: multipart/mixed; boundary=
FACT-CERTIFICATE-BOUNDRY
Countent-ID:
<certifier.utilityinc.com/certifier/
5440118b9d473998df57e02dfe2b7d6aa09353cf>
--FACT-CERTIFICATE-BOUNDRY--
Content-Type: application/json
{
"certifier":"http://certifier.utilityinc.com",
"observer-id":"gauge19982@certifier.3rd-party.com/utilityinc",
"observation-time":"2012-02-16T01:44Z",
}
--FACT-CERTIFICATE-BOUNDRY--
Content-Type: text/plain
12.076 [kWh]
--FACT-CERTIFICATE-BOUNDRY--
}
```

The time-stamped digest sent to the 3rd-party verifier will specify the company Certifier in its universal fact identifier and will be a single-part MIME document with only the JSON header:

```
{
MIME-Version: 1.0
Content-Type: multipart/mixed; boundary=
FACT-CERTIFICATE-BOUNDRY
Countent-ID:
<certifier.utilityinc.com/certifier/
5440118b9d473998df57e02dfe2b7d6aa09353cf>
Content-Type: application/json
{
"certifier":"https://certifier.utilityinc.com",
"observer-id":"gauge19982@certifier.3rd-party.com/utilityinc",
"observation-time":"2012-02-16T01:44Z",
}
```

8.6.4 Determination of Unit Price

The unit price as published by the company from time to time has no privacy strings attached, yet here too the customer does not trust the company's Certifier. Similarly to the above, a "Witness" pattern is used. The company billing office registers as an observer with the 3rd-party Certifier. When a new unit price is set, the billing office requests certification. This certified fact is used to produce the bill.

8.6.5 Certification of Observed Facts: Receiver

While the rest of the example can only be completed below after discussion of deduced facts, note that the above already demonstrated how the customer can verify both observed facts included in the bill-usage and price. On the bill produced by the company, hyperlinks or scan-able barcodes, such as Quick Response (QR) barcodes (ISO/IEC 18004:2006 standard) can point the customer's computer to the website http://certifier.3rd-party.com/utilityinc to receiver easy and conclusive verification of these observed facts.

8.7 Example Application: Digital Legal Evidence

As a second example, we return to the application example of digital legal evidence. This example illustrates the design of a system that addresses concerns regarding authenticity of observations collected with a digital measurement device and submitted as digital information as legal evidence.

Figure 12:
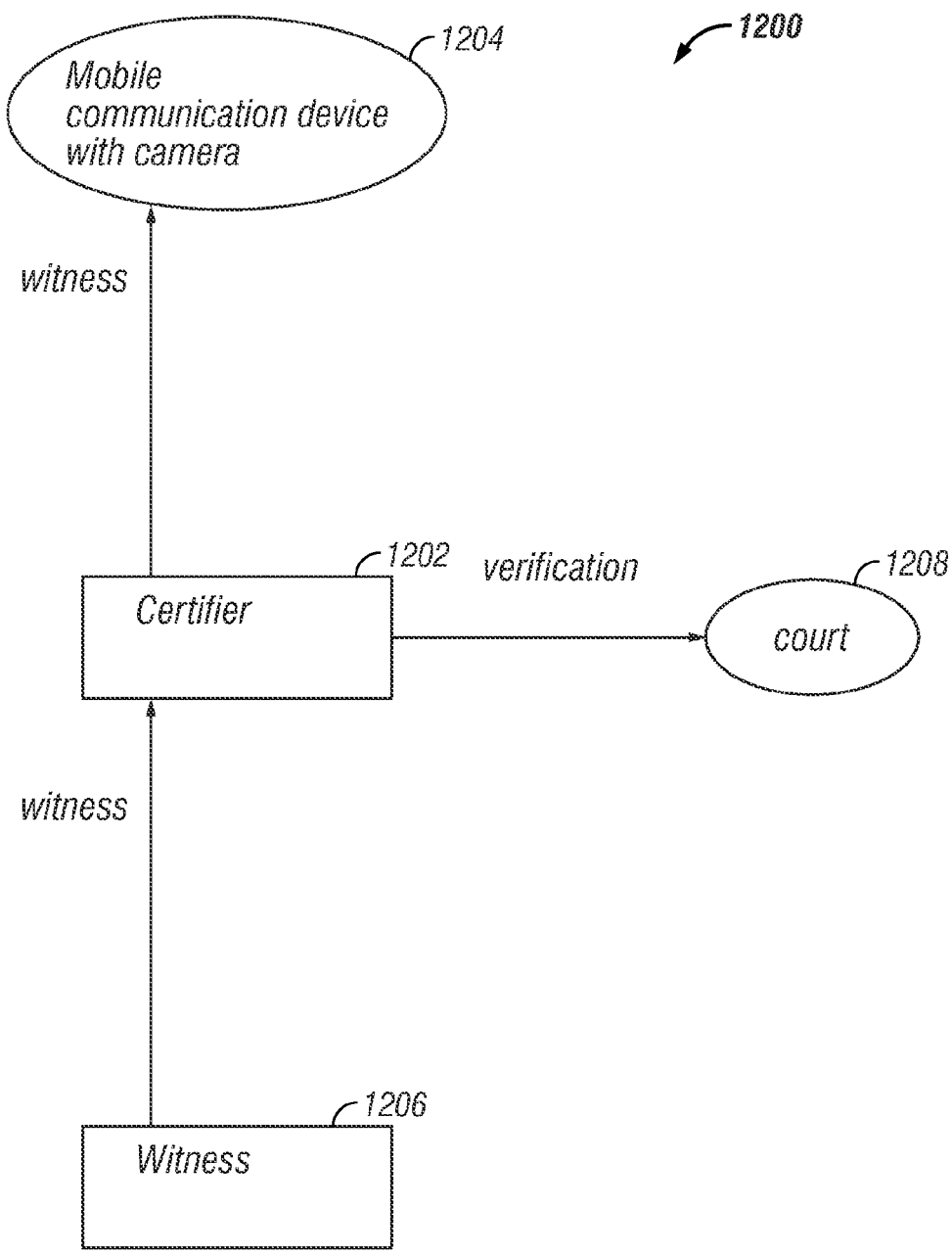
FIG. 12 provides a design chart illustrating a Digital Evidence certification system.

FIG. 12 shows the design of a certification system 1200 for digital evidence. The following describes the system components. Central certifier server 1202 provides a witness service to mobile communication device with camera 1204. Any party interested can register as a witness 1206 with the central certifier server 1202. The certifier server 1202 provides a verification service to the court 1208.

8.7.1 Digital Legal Evidence Mobile Communication Device with Camera

The photography equipment in this application is any device equipped with a digital camera with a rudimentary computational ability and an Internet connection. Popular "smart" mobile phones, laptop computers, tablet devices etc. all fall into this category. The device is equipped with a software component that allows it to participate in the fact-exchange cycle described below.

8.7.2 Certifier

The certifier in this system is operated by the state or federal court, or by a third party who is appointed and trusted by them. The Certifier is an HTTP server whose URL is published.

8.7.3 Witness

Implementing the "public witness" design pattern, the certifier allows anyone to register to receive notifications regarding new photographs submitted. Anyone who does not trust the Certifier and is interested in maintaining their own record of evidence submitted may register as a witness with the Certifier.

8.7.4 The Fact-Exchange Cycle for Certified Digital Evidence

In the certification phase, the mobile device is used to take a photograph. The software element installed on the device calculates a secure digest of the photograph image file and submits a fact affidavit to the Certifier over the Internet connection, namely, a JSON file containing the secure hash and a time-stamp.

In the fact presentation phase, the photograph is submitted to the court as evidence.

In the verification phase, the court consults its Certifier and checks whether a secure digest matching that of the submitted photograph file has been accepted by the Certifier within a reasonable time window after the time when the photograph was supposedly taken. (The acceptable window may be set to be as short as a few seconds). If the certifier has indeed accepted the digest, than this serves as proof that the photograph, as submitted, existed at the time-stamp stated and had not been manipulated since.

9. Certification of Deduced Facts

The following describes the certification system for deduced facts. In an embodiment, the certification system for an observed fact above and the certification system for deduced facts described below are implemented in the same device.

9.1 Basic Design

In the basic design of certification system for observed facts, the Certifier is a system providing a certification service for the fact presenter and a verification service for the fact receiver, as shown in FIG. 7.

Any system with the following abilities can serve as a Certifier:
 1. The ability to generate time-stamps from the universal time.

2. The ability to store and facts permanently and retrieve facts from storage.
3. The ability to receive and respond to requests from both fact presenter and fact receiver.

In some extended implementations, the Certifier may also need to be able to—

Communicate with our Certifiers.
Execute reasoned deduction processes.

9.2 The Basic Certification Process

The primary concerns of the receiver regarding a deduced fact are that the fact be accurate and transparent. Recall that a deduced fact is accurate if the deduction process as stated has been applied or executed accurately and correctly to produce the stated result. According to the invention principles, the presenter guarantees that a deduced fact is accurate by stating the deduction process that generated it, along with the facts on which it is based.

The following is the basic certification process and fact-exchange cycle for deduced facts, specializing the general fact-exchange process enabled by the system and method (FIG. 3).

9.2.1 Fact Certification Phase

1. Fact presenter communicates a certification request to the Certifier. The request includes the deduced fact to be certified, a description of the deductive reasoning process that generated the fact and the fact certificates of the basis facts (either the full basis fact certificates or a citation of them may be included—see the embodiment below).
2. Certifier retrieves each of the basis fact certificates and checks that the universal time at which certification request was received is later than the time-stamps on each of the certificates of the basis facts.
3. Certifier inspects each of the basis fact certificates (the nature of this inspection depends on an embodiment, as discussed below).
4. Certifier inspects the fact presented for certification.
5. If all inspections pass, certification is granted. In this case:
   (a) Certifier issues a fact certificate and stores it in permanent storage. (Either the full basis fact certificates or a citation of them are included in the fact certificated issued—see the embodiment discussed below).
   (b) Certifier adds a time-stamp of the universal time at which the certificate was issued on the certificate.
   (c) Certifier returns the fact certificate to the presenter.

9.2.2 Fact Presentation Phase

The fact presenter can store the certificate for any period of time before presenting the fact. To present the fact, presenter communicates the fact and the certificate to receiver.

9.2.3 Fact Verification Phase

The nature of this phase is governed by the embodiment discussed below. The verification of a deduced fact involves:
1. verification of all its basis facts, and
2. execution of the stated deductive reasoning process.

Each of these tasks can be performed by the receiver or offered as a service by the Certifier.

9.3 Design Patterns

The design of any deduced fact certification system requires certain design decisions to be made. The following discussion regards notable design decisions and the considerations involved in making these decisions for specific situations, and discusses examples of design patterns that may be used to extend the basic design of a certification system for deduced facts.

These embodiments and design patterns demonstrate how the basic design may be adapted to various concerns the parties may have and to different situations encountered in practice, including situations where:

1. Certifier has storage and/or communication constraints and is not able to store or communicate data-massive facts.
2. Communication between presenter and Certifier is only possible in the unilateral direction from presenter to Certifier (e.g. broadcasts by presenter).
3. Fact presenter has a privacy concern and is not willing to disclose the deduced fact and/or the reasoning deduction process and/or some of its basis facts to receiver.
4. Fact presenter has a strict privacy concern and is not willing to disclose the deduced fact and/or the reasoning deduction process and/or some of its basis facts even to Certifier.
5. Fact receiver does not trust the Certifier.
6. Fact presenter or receiver are concerned about the catastrophic implications of physical damage to the Certifier.

9.3.1 "Basis Inclusion" Vs "Basis Citation" in Certificates

Figure 13:
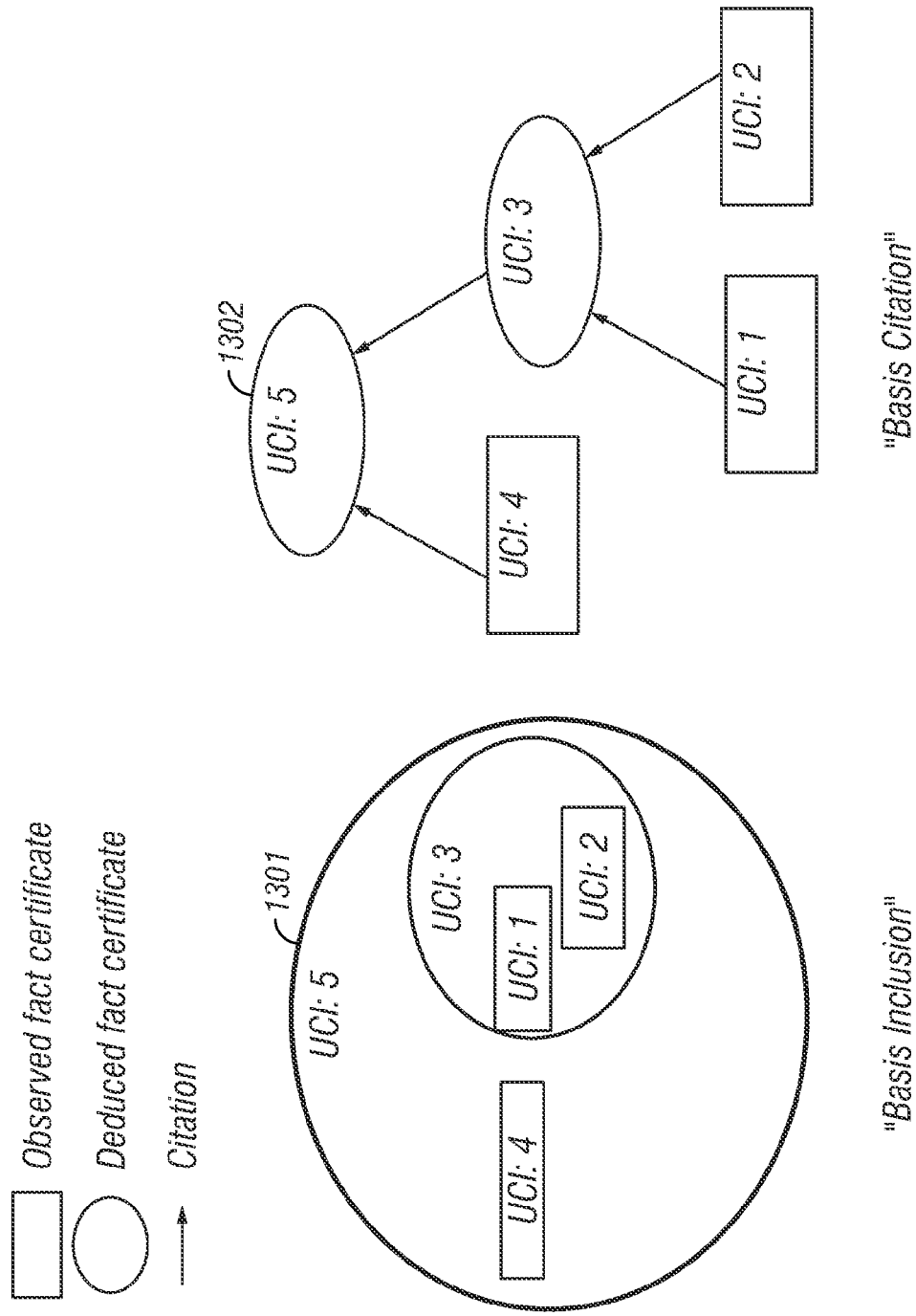
FIG. 13 provides a design chart illustrating a structure of a deduced fact certificate under "Basis Inclusion" and "Basis citation" models for certification of a deduced fact.

Certificates of basis facts are fundamental to a deduced fact certificate. In designing a fact certification system for deduced facts, a decision has to be made regarding whether deduced fact certificates include all the information of the basis fact certificates ("Basis Inclusion") 1301, or use an addressing system to unambiguously cite the basis fact certificates while not actually including their information ("Basis Citation") 1302. The options are illustrated graphically in FIG. 13.

The following discusses some of the considerations involved in making this decision:

The basis inclusion model generates stand alone certificates. In this model, the only outside communication a receiver needs in order to inspect a deduced fact certificate is verification requests to Certifiers of observed basis facts (this communication cannot be avoided, because observed fact certificates cannot be inspected without making a verification request to the Certifier who issued the certificate). In contrast, in the basis citation model the basis fact certificates must be retrieved from the Certifier storing them before the certificate itself can be inspected;

For complicated deduced facts, whose basis includes several layers of deduced facts based on deduced facts and so on, the certificates under the inclusion model can become very large documents. This may make them difficult or impossible to communicate and to store. In contrast, in the citation model the size of the certificates does not grow with the number of deduced fact layers.

9.3.2 "Deep" Vs. "Shallow" Certificate Inspection by Certifier During the Certification Phase As part of the basic verification process for deduced facts above, the Certifier inspects the certificates of basis facts provided by the presenter. In designing a fact certification system for deduced facts, a decision has to be made regarding the nature of this inspection when a basis fact is another deduced fact. In the "Deep" verification model, the Certifier may inspect each basis fact certificate that is a deduced fact as a receiver would, and specifically, executes the deduction process stated on the basis fact certificate to check that it had been applied correctly. In the "Shallow" verification model, the Certifier may check that the basis fact certificate is syntactically intact (namely, that the time-stamp on the basis certificate precedes the time at which the fact being certified was received, and that the basis certificate is available and contains all information required) but does not execute the deduction process as a receiver would.

The same choice applies to the deduced fact presented for certification itself: in the "Deep" model, the certifier executes the stated deduction process and checks that it was applied correctly, whereas in the "Shallow" model it only checks that it is syntactically intact.

The following discusses some of the considerations involved in making this decision:
- The deep verification model leads to a stronger sense of certification: the Certifier that issues a deduced fact Certificate can guarantee that the deduced fact being certified is accurate and transparent in the sense of the detailed concerns of the fact receiver. In contrast, the shallow verification mode is a weaker sense of certification: in this case a deduced fact certificate is guaranteed to be transparent, and to make available all information required to evaluate its accuracy. In other words, in this case the certificate guarantees that the deduced fact is at all verifiable, rather than actually verifying it. When the Accuracy concern is a primary concern for the receiver, the deep verification model should be used;
- In order to implement the deep verification model, the Certifier needs shall be able to execute deductive reasoning procedures. In computer-based implementations, this requires that presenters state deductive procedures using a formal language, containing instructions that the Certifier can execute. While this invention certainly applied to situations where deductive procedures can be stated exactly but not in a manner executable by a machine, in this case deep verification cannot be achieved by an automated Certifier;
- In terms of computing power, when the deductive processes are in fact computing-intensive procedures, implementing a deep verification model may involve more computing resources than the shallow model, even considerably more; and
- When implementing a deep verification model, the Certifier may encounter the same fact certificate several times, because it acts as a basis fact certificate for several different deduced facts. By noting on the permanent storage which certificates have already been inspected, the certifier needs only inspect each certificate once. In subsequent encounters with the same certificate, the note on permanent storage will allow the Certifier to avoid repeating the inspection.

9.3.3 "Certifier-Side" Vs. "Receiver-Side" Fact Verification During the Verification Phase The verification service provided by the Certifier to the fact receiver can take one of two forms. In the "Receiver-side" verification model, the Certifier responds to the verification request by providing the receiver with all the information that the receiver needs in order to inspect the certificate, but it is the receiver who executes the deductive reasoning process and checks that it was applied correctly.

In the "Certifier-size" verification model, the Certifier offers a more extensive service: in response to the verification request, the Certifier performs a full inspection of the certificate, including the execution of the deductive reasoning process and inspection of all basis fact certificates, and responds to the request with the results of the inspection. As noted in the "Deep" vs. "Shallow" decision above, the Certifier may keep track of certificates already inspected, and provide the verification more efficiently.

9.3.4 "Fact Affidavit with a Trusted Certifier" Pattern

Analogous to the respective pattern for observed facts with the same name, discussed above, this pattern enables the receiver to trust a deduced fact that is not disclosed to him in full. This means that the fact content, or its generating deductive reasoning process, or some of its basis facts are not disclosed. This is useful when the fact presenter has a privacy concern and is not willing to disclose these information pieces to the receiver.

9.3.5 "Trustee" Pattern

The Trustee pattern provides a solution to the situation where the deduced fact to be certified includes private information, but the certifier is untrusted. Similar to a witness, the trustee is an additional certifier in the fact-exchange cycle. The trustee is trusted by the presenter. At the certification phase, the presenter presents the trustee with the full fact certificates. The trustee is allowed to disclose the contents of a small amount of facts as set initially by the presenter. The presenter presents the certifier with the fact affidavits only—secure digests that do not disclose the private information.

At the verification stage, the certifier obtains the full basis of the claim in digest form, meaning that the certifier knows the universal fact identifier of each fact on which the deduced fact is based. The receiver is allowed to choose a small number of private facts and make "strong" verification request to the trustee, in response to which the trustee reveals the full certificate. Because the receiver is the one choosing which fact digests to reveal, the receiver can trust the information that he has not seen.

9.3.6 "Assumption" Pattern

The "Assumption" pattern is intended to accommodate cases where some of the facts upon which a deduced fact is based are not facts at all, but rather unverifiable assumptions. This happens when a deduction process is based on pieces of information that were never observed, but rather assumed or set arbitrarily by the presenter. This includes, for example, assumptions about future conditions.

In this pattern, a deduced fact can list as a basis fact a piece of information, without citing it as a fact. This makes it explicit that the validity of the deduced fact is only regarded as being conditioned on the validity of the assumption.

9.5 Exemplary Embodiment

This description continues description of the exemplary embodiment for certification system of observed facts, discussed above. The Certifier is a computational system that includes a permanent storage unit and communicates with the computational agents of fact presenters and fact receivers over the Internet or a similar TCP/IP local network. To implement the "shallow" verification embodiment, the Certifier for deduced facts is similar to the Certifier for observed facts and both roles can be fulfilled by the same device. To implement the "deep" verification embodiment, the Certifier is implemented with an additional module that is to execute the deduction processes used to generate deduced facts.

The following key components are added to the components of an exemplary embodiment for certification system of observed facts, discussed above.

9.5.1 Formal Description of Deductive Reasoning Processes

A certificate of deduced facts includes a description of the deductive reasoning process that was used to generate the fact. The nature of deductive reasoning process varies widely between different embodiments and applications of this invention. An embodiment is designed to allow computer-implemented automatic inspection of deductive reasoning processes, either by the certifier (the "Certifier-side verification" embodiment above) or by the fact receiver ("Receiver-side verification" embodiment above).

In an embodiment, the deductive reasoning process is described by a computer-executable program that receives the basis facts as inputs and generates the deduced fact as output.

In different implementations, the deductive reasoning process may be a script or a package of scripts intended to be executed by an interpreter. Interpreted programming languages that can be used include Python, R, Stata, Matlab, Ruby, Perl, PHP and Javascript. In such implementations, to request certification of a deduced fact the fact presenter includes a script or a package of scripts that is later included in the fact certificate. For example, the portion of the certificate that describes the deductive reasoning process may be

```
"deductive-procedure-language":"Matlab 7.13",
"deductive-procedure":"
  function DEDUCED-VALUE = calculate_amount_due(UNITS,PRICE)
    DEDUCED-VALUE = max(0 , UNITS * PRICE);
"
(... certificate continues ...)
```

In other specific implementations, the deductive reasoning may incorporate, or be completely based on, program source code that has to be compiled into executable binary files or virtual machine byte-code prior to execution. Compiled programming languages that can be used include the ANSI C++, Java and Fortran programming languages. In such implementations, to request certification of a deduced fact the fact presenter includes program source code, dependencies and a make file as a package that is later attached to the fact certificate.

9.5.2 Fact Certificate

In an embodiment, a fact certificate for a deduced fact is a specially formatted ASCII file built using the MIME format (IETF RFC 2045, 2046 and 2048). Specifically, it is a multipart MIME form with a header and two or more main parts. The header includes the universal fact identifier in the MIME field "Content-ID". As discussed in the exemplary implementation for observed facts, one possible definition for the universal fact identifier is the concatenation of the certifier URL and the SHA-1 digest of the complete fact certificate.) The first part of the multipart MIME file is a Java Script Object Notation (JSON) object providing meta-information about the fact. The second part is any MIME type (commonly, of the types above) and contains the fact information itself. Additional variations are possible where the deductive procedure source package is provided in subsequent parts of the multipart MIME file.

Under the "Basis-inclusion" embodiment, additional MIME parts will include the basis fact certificates.

The following is an example of an exemplary embodiment of a deduced fact certificate in the "Basis-citation" model.

```
{
MIME-Version: 1.0
Content-Type: multipart/mixed; boundary=FACT-CERTIFICATE-
BOUNDRY
Countent-ID: <http://certifier.3rd-party.com/utilityinc/
5440118b9d473998df57e02dfe2b7d6aa09353cf>
--FACT-CERTIFICATE-BOUNDRY--
Content-Type: application/json
{
"certifier":"https://certifier.3rd-party.com/utilityinc",
"deductive-procedure-language":"PHP 5.3.1",
"deductive-procedure":"$DEDUCED-VALUE = ($UNITS * $PRICE)",
"basis-facts":{
"UNITS":{
"certifier":"https://certifier.3rd-party.com/utilityinc",
"ufi":"https://certifier.3rd-party.com/utilityinc/
a9d0fb50594eeb5a6e21daacf03956c419a6b2cf",
"observation-time":"2012-02-16T01:44Z"
{
"PRICE":{
"certifier":"https://certifier.3rd-party.com/utilityinc",
"ufi":"https://certifier.3rd-party.com/utilityinc/
ea293fa9053d7fc49d589c5ec2989e42dab78721",
"observation-time":"2011-01-16T10:44Z"
}
}
}
--FACT-CERTIFICATE-BOUNDRY--
Content-Type: text/plain
100.00 [USD]
--FACT-CERTIFICATE-BOUNDRY--
}
```

In variations on this implementation, deduced fact certificates may contain the fact value of the basis facts in the body of the certificate.

9.5.3 Deductive Reasoning Process Execution Module

The following discusses implementations that follow the "deep" verification embodiment, whereby the certifier repeats the deductive reasoning procedure to verify that it yields the stated result, namely the stated deduced fact. In these implementations the certifier is equipped with a module that can compile if needed and execute programs of the particular language used in the application to describe deductive reasoning procedures.

Due to security considerations, the currently best understood mode to implement this module uses a virtual machine that separates the physical host machine from the software environment that is accessible to the programs being executed.

9.5.2 Fact Certificate

In an embodiment, a fact certificate for a deduced fact is a specially formatted ASCII file built using the MIME format (IETF RFC 2045, 2046 and 2048). Specifically, it is a multipart MIME form with a header and at least two main parts. The header includes the UFI (Universal Fact Identifier) in the above format in the MIME field "Content-ID". The first part may be a Java Script Object Notation (JSON) object providing meta-information about the fact. The second part may be any MIME type (commonly, of the types above) and contains the fact information itself.

Under the "Basis-inclusion" embodiment, additional MIME parts will include the basis fact certificates.

The following is an example (from the Utility application example below 9.6 of an embodiment of a deduced fact certificate in the "Basis-citation" model:

```
{
MIME-Version: 1.0
Content-Type: multipart/mixed; boundary=FACT-CERTIFICATE-
BOUNDRY
Countent-ID:                                    <http://certifier.3rd-
party.com/utilityinc/5440118b9d473998df57e02dfe2b7d6aa09353cf>
--FACT-CERTIFICATE-BOUNDRY--
Content-Type: application/json
{
"certifier":"https://certifier.3rd-party.com/utilityinc",
"deductive-procedure":"$DEDUCED-VALUE = ($UNITS * $PRICE)",
"basis-facts":{
"UNITS":{
"certifier":"https://certifier.3rd-party.com/utilityinc",
"ufi":"https://certifier.3rd-
party.com/utilityinc/a9d0fb50594eeb5a6e21daacf03956c419a6b2cf",
"observation-time":"2012-02-16T01:44Z"
}
"PRICE":{
"certifier":"https://certifier.3rd-party.com/utilityinc",
"ufi":"https://certifier.3rd-
party.com/utilityinc/ea293fa9053d7fc49d589c5ec2989e42dab78721",
"observation-time":"2011-01-16T10:44Z"
}
}
}
--FACT-CERTIFICATE-BOUNDRY--
Content-Type: text/plain
100.00 [USD]
--FACT-CERTIFICATE-BOUNDRY--
}
```

In variations on this implementation, deduced fact certificates may contain the values of the basis facts in the body of the certificate.

9.5.3 Deductive Reasoning Process Execution Module

The following discusses implementations that follow the "deep" verification embodiment, whereby the certifier repeats the deductive reasoning procedure to verify that it yields the stated result, namely the stated deduced fact. In these implementations the certifier is equipped with a module that can compile if needed and execute programs of the particular language used in the application to describe deductive reasoning procedures.

Due to security considerations, an embodiment uses a virtual machine that separates the physical host machine from the software environment that is accessible to the programs being executed.

9.6 Example Application Continued: Scientific Research Reports

We now continue description of the Scientific Research Reports example application. The parties involved, their concerns, the nature of the facts exchanged and the fact-exchange cycle have been described herein above.

The following describes an embodiment in the realm of scientific research reports. This embodiment has been implemented as a software system by the authors. It is included as a specific example for the embodiment of the certification system for deduced facts described above.

The following discussion describes the key components and architecture of the system. Each of the following components is discussed in a subsection below:

The researcher's platform;
Certification Plug-in Scientific computing platform;
Result certificate;
Computation Repository;
Word processor plug-in; and
Computation browser.

9.7.1 The Researcher's Platform

The researcher is using a computer with an array of software to produce the results. Particularly, this computer has a compiler or an interpreter for the scientific programming or scripting language used to perform the computation and produce the result.

9.7.2 Certification Plug-in for Scientific Computing Platform

As in the existing implementation, the researcher installs a software plug-in that extends the functionality of the programming or scripting language used. This plug-in may be specific for a compiler or an interpreter. The plug-in causes the computation that is generating the result to transmit information about the computation to the computation repository (the Certifier in this setting as discussed herein below). This information, transmitted as part of the program execution, consists of the execution flow of the program, the source code of each function executed, the run-time values of the input and output arguments of each function invocation, and the results produced.

To allow the researcher (now in the role of the programmer) to distinguish the results from other variables, to control the parts of the program that are documented and to withhold some parts as private, the plug-in introduces a few new reserved words, or modifiers, into the programming or scripting language syntax. The following example uses a generic syntax that is identical or similar to syntax of each of the languages mentioned above.

The plug-in requires the programmer to designate a repository to certify the facts generated by the computation, by specifying a URL, for example https://repo.scientific-result.org.

Whereas the instruction a=5; declares a local variable and assigns it the value 5, with the plug-in, the instruction certified a=5; causes the program to submit this value as a result, namely a fact, for certification by the designated repository overlooking the computation. Certification happens as the computation is taking place, and this result is assigned a Universal Identifier by the repository, for example:

https://repo.scientific-result.org/e61cc0c22967f494873-d1425ac07d06987e3617a.

This universal identifier may be printed to standard output or may become available as a local string variable.

Whereas the instruction 'func(5);' invokes the function with name func and a single argument with value 5, with the plug-in, the instruction certified 'func(5);' causes the program to submit the function source code and argument value 5 to the repository. If the function 'func' creates any results, the function source code is a formal description of the deductive reasoning process as defined generally in this disclosure.

A key ingredient of the certification process for deduced facts 9.2 is that a certification request for a deduced fact should include the basis fact certificates or an explicit citation of the basis facts.

To allow this in the case of certification of computational results the plug-in extends the function invocation syntax and allows invocation of a function when passing a universal identifier instead of a variable name in the local computer memory. For example, the plug-in allows invocation of the function 'func' using the instruction certified 'func(https://repo.scientific-resultorg/e61cc0c22967f494873d1425-ac07d06987e3617a'.

With this syntax introduced by the plug-in, any result that is created inside the function 'func' submits, in its certification request, the source code of 'func' as its deductive process and the certified fact with the fact identifier above as its basis fact.

To allow certification of private facts using the "digest" and "affidavit" design patterns, the plug-in introduces the reserved word secret into the language. For example, the instruction secret certified 'a=5;' causes the program to request that the repository would only release a digest of the certificate, and not the fact itself.

The plug-in communicates with the repository using JSON files as described above, transmitted over HTTP. To communicate data, and in particular values of double-precision vectors or matrices, or graphical figures, the plug-in uses a standard format, such as HDF5, for numerical data and Post Script for graphical data).

9.7.3 Result Certificate

The result certificate consists of the source code of the function, including the instruction that created the result, the universal identifiers of the input arguments received in runtime and the universal identifiers of the output arguments returned in runtime, in the JSON format discussed above.

9.7.4 Computation Repository

The computation repository here may serve as a Certifier for computational results. In the existing implementation, the certifier is may be an HTTP server and the certifier permanent fact storage may be implemented using an SQL database back-end.

The design of this certification system follows the "Basis citation" implementation (whereby deduced fact certificates reference their basis facts by citing the universal identifier), the "Shallow" certificate inspection embodiment (whereby the certifier does not attempt to repeat the deduction process stated when certifying a deduced fact) and the "receiver-side" fact verification embodiment whereby in the verification phase the receiver obtains all necessary information to repeat the deduction process but has to repeat it himself.

To implement the fact-exchange cycle, the repository provides a data-upload service during the certification phase and a data-download service during the presentation and verification phases.

The repository server handles a large number of connections simultaneously, namely can service multiple requests regarding different facts.

9.7.5 Word Processor Plug-in

The system enables result certificates to be presented by presenting their universal identifier, which doubles as an URL that is served by the repository. This "Certificate Presentation" service is discussed more generally herein below. The scientific report therefore does not need to include the full certificates in the document body, and only citations (in this case, URL addresses) appear in the document.

The system implemented allows the author to present certified results in scientific reports and publications, as discussed herein below. A word processor plug-in is provided, which allows the author to include universal fact identifier in a manuscript prepared in any one of a few popular word-processing software products. When typesetting the document, the plug-in retrieves the result from the repository and formats it. For example, if the result is a graphical figure, the plug-in negotiates a graphical file format with the repository and obtains a graphical file in that format over HTTP. In a typeset electronic document, a certified fact (e.g. a number, a table or a graph) is a hyperlink that points to the URL that is the universal fact identifier. For example, the certified fact created using the instruction certified 'a=5;' above will appear in an HTML publication as <A href='https://repo.scientificresultorg/e61cc0c22967f494873d1425ac07d06987-e3617a'> 5</A> instead of just 5. In a typeset printed media or visually presented material (such as a poster), the certified result is accompanied by a 'R' barcode that encodes the same URL, as discussed herein below.

9.7.6 Verification Service and Computation Browser

The verification service offered by the repository has two aspects. To address the accuracy concern, namely that the deduction process, or in this case, the program, has been executed correctly as stated, the repository allows downloading of the program and its dependencies.

To address the transparency concern, namely that the certificate clearly details the complete basis of observations and deductions on which the result is based, the repository provides a "computation browser" service. When a reader directs a web browser at the URL that is the universal identifier of a result, a web page is produced that explains the details of the computations as they occurred when the result was created. This page contains links that allow browsing of the input arguments, output arguments, source code and so on. This allows the reader to examine, to an arbitrary degree of scrutiny, the computation as it was recorded in real time.

9.8 Example Application Continued: Mortgage-Based Securities

The following continues the example for certification of MBS valuation described herein above, and describes a certification system for MBS valuation, as an application of the invention. The system described is responsive to the parties' concerns, and primarily to the investor's concern regarding transparent and generally trustworthy MBS valuation.

The following describes the system components.

9.8.1 Appraisal Professional

Using the "observer" pattern, the appraisal professional registers in advance with the Securitization trust Certifier (below). Registration requires a valid appraisal license and has to be renewed annually. The appraisal professional uses a web browser to request certification from the Securitization trust Certifier (below).

9.8.2 Bank

Bank employees use a secure web application, or the bank's enterprise software to request certification for load terms from the Securitization trust Certifier (below).

9.8.3 Securitization Trust Certifier

This is an HTTP server operated by the Securitization trust. As previously described, it requires an Internet connection and a large storage unit.

9.8.4 Securitization Trust

Trust employees use a secure web application or an enterprise software application to generate valuations and to request certification for MBS valuation from the regulatory agency Certifier (below).

9.8.5 Regulatory Agency Certifier

This is a massive server or a collection of servers that are serving the entire community, with an Internet connection. Implementing the "witness" pattern, the regulatory certifier is send fact affidavits of the facts revealed to the Securitization trust certifier.

Figure 14:
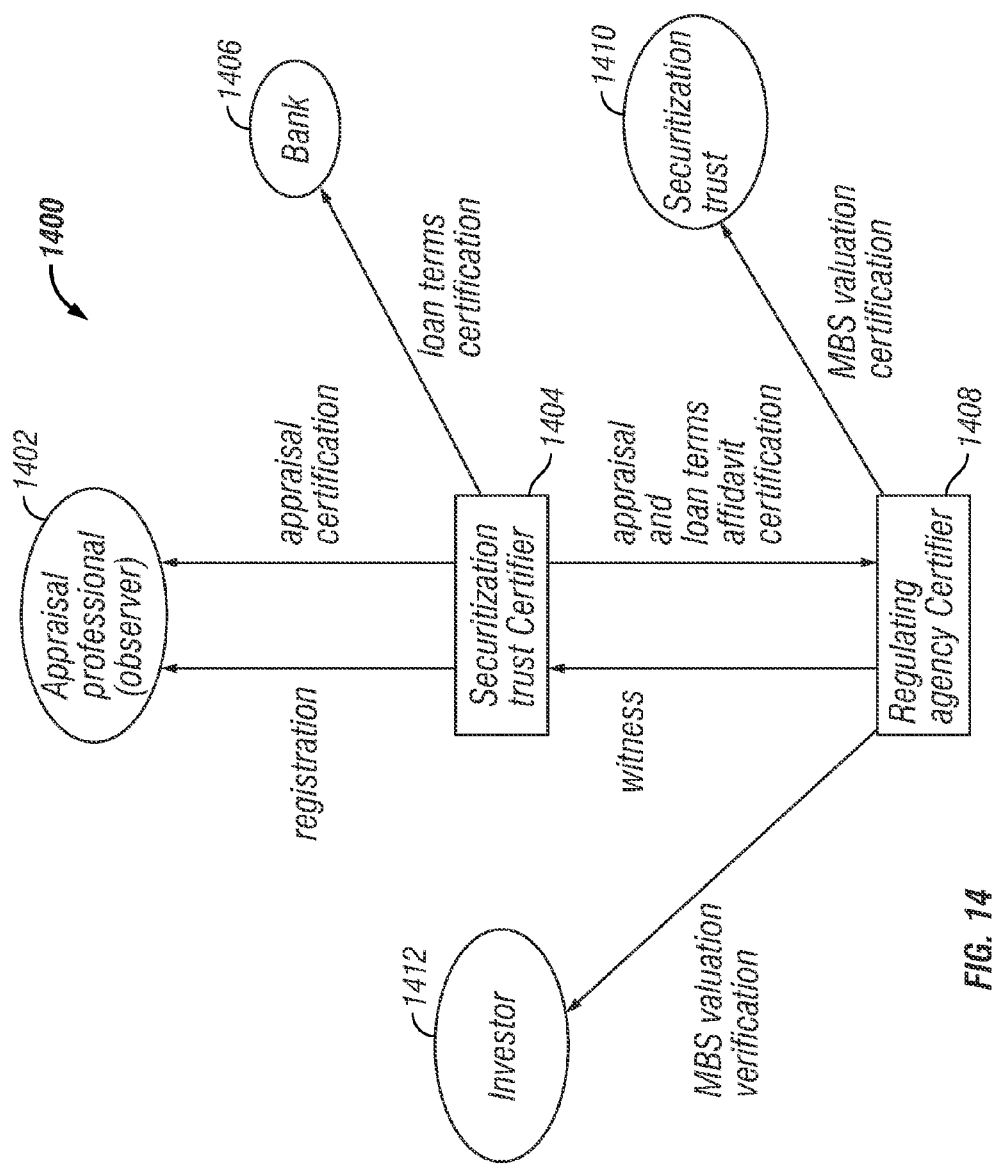
FIG. 14 provides a design chart illustrating a certification system for MBS valuation.

The design of a certification system 1400 for MBS valuation appears in FIG. 14. Here, the regulatory certifier sends fact affidavits of the facts revealed to the Securitization trust certifier.

An appraisal professional 1402 is an observer that registers with the securitization trust certifier 1404. The securitization trust certifier 1404 provides the appraisal professional 1402 with certification services for appraised value facts. The securitization trust certifier 1404 also provides the bank 1406 with a certification service for loan term facts. The regulating agency certifier 1408 provides the securitization trust certifier 1404 with a witness service for all facts certified by the securitization trust certifier. The securitization trust 1410 receives a certification service for the security valuation from the regulatory agency certifier. The investor 1412 receives a verification service for the security valuation from the regulating agency certifier.

9.8.6 Alternate Embodiments

This system uses the "basis-citation" embodiment of 9.3.1 to allow the bank to withhold private information items such as the debtor identity. Also, this system uses the "deep" verification embodiment 9.3.2, namely the certifiers repeat the arithmetic calculations presented as deduction processes and verify their correctness.

9.8.7 Fact-Exchange Cycle

Figure 15:
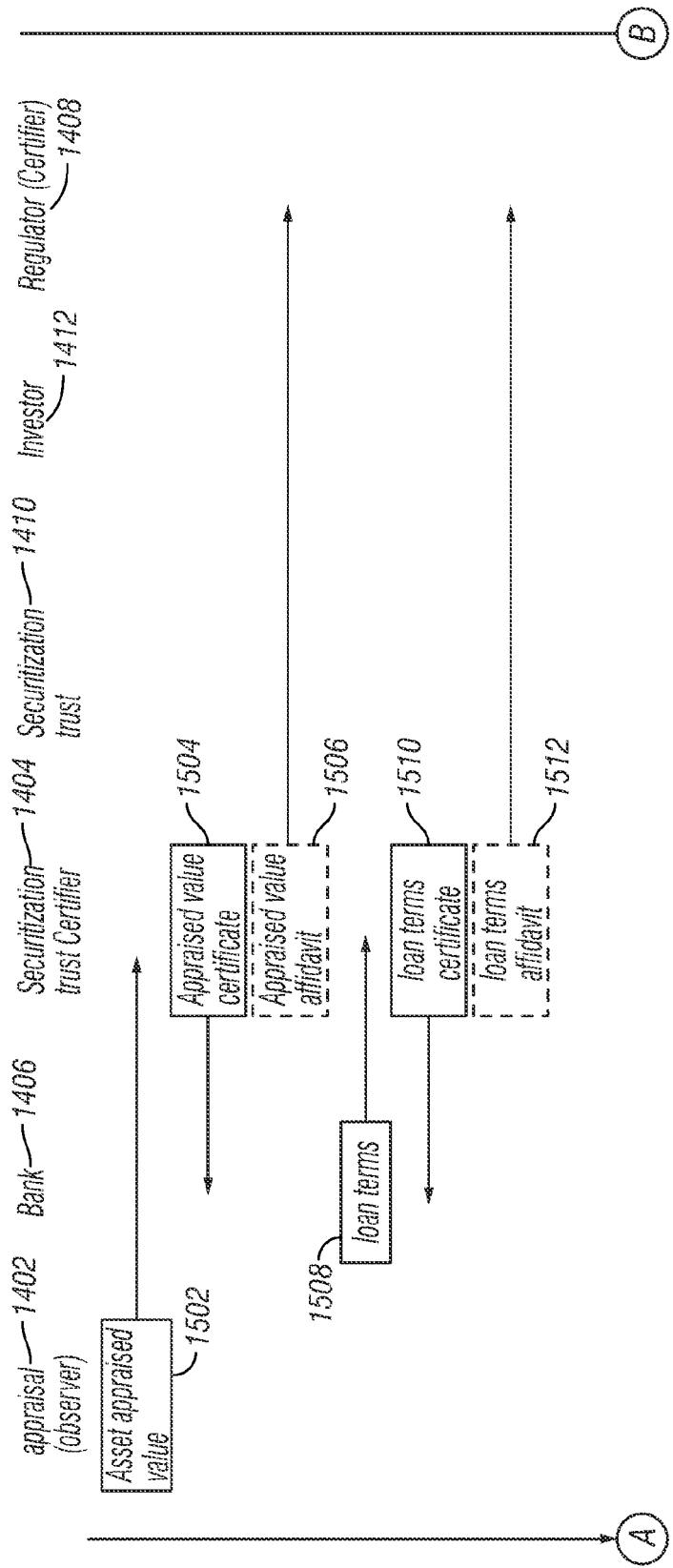
FIG. 15 provides a chart illustrating a certification system for MBS valuation.
Figure 15:
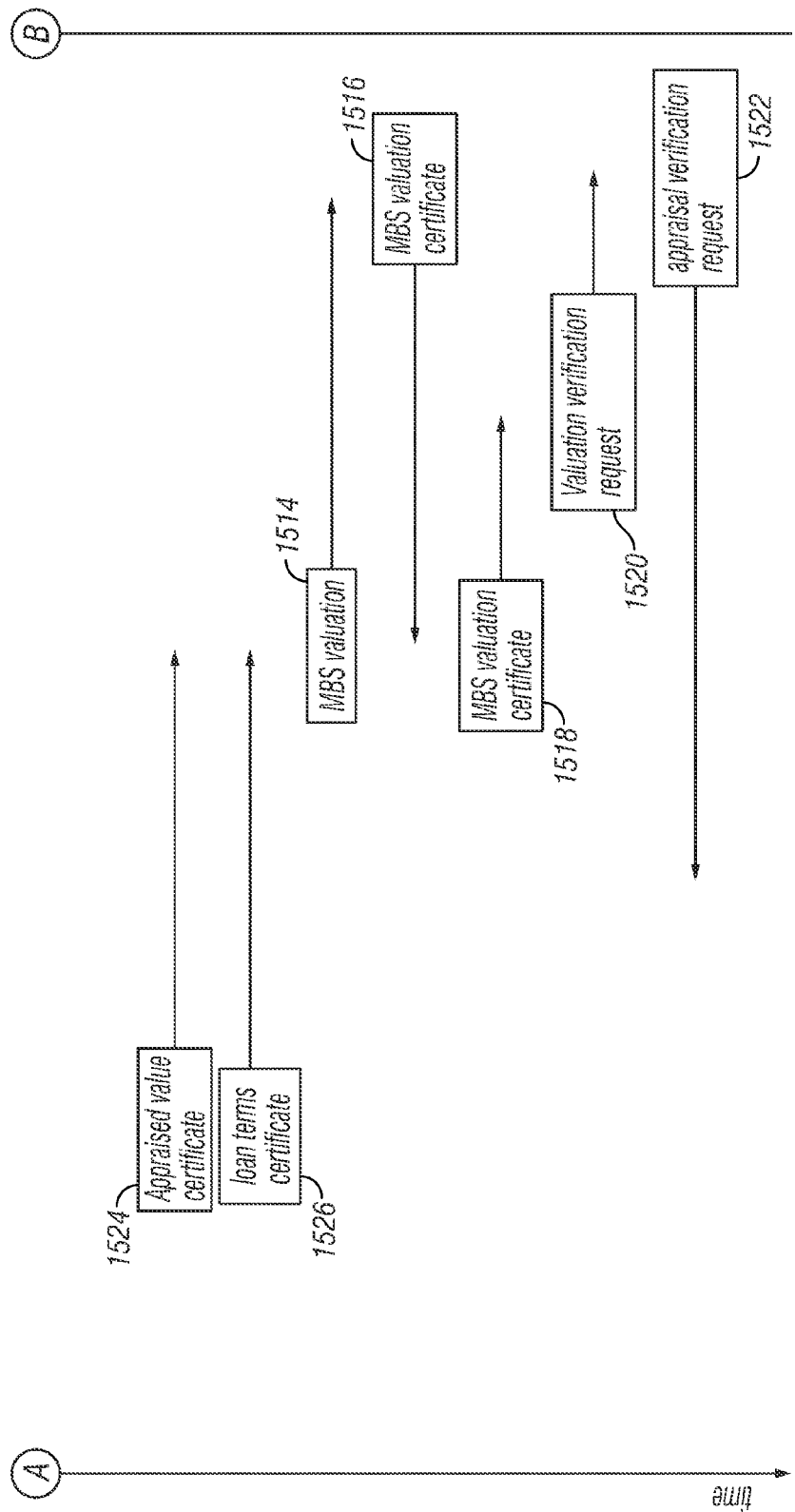

The fact-exchange cycle 1500 is summarized in FIG. 15. In the certification phase, Appraisal professional 1402, an observer registered with securitization trust certifier 1404 requests certification for appraisal fact 1502 from securitization trust certifier 1404. Securitization trust certifier 1404 communicates appraisal certificate 1504 to bank 1406 and simultaneously communicates appraised value affidavit 1506 to regulating agency certifier 1408. Bank 1406 deduced the loan terms fact 1508 and presents it to securitization trust certifier 1404 for certification. Again, a certificate 1510 is sent to the bank and an affidavit 1512 is sent to the regulator certifier 1408. Securitization trust 1404 deduced MBS valuation fact 1514 and presents to regulator certifier 1408 for certification. MBS valuation certificate 1516 is returned to the securitization trust 1410. In the fact presentation phase, securitization trust 1410 presents the MBS valuation certificate 1518 to investor 1412. In the fact verification phase, investor communicates a verification request 1520 to regulator verifier 1408. Under predetermined conditions such as a court subpoena, regulator 1408 can submit a strong verification request 1522 to securitization trust certifier 1404 and receive full certificates of appraisal 1522 and loan terms 1526.

For fact "appraised value":
1. Appraisal professional, a registered trusted observer as described in the "observer" pattern for certification of observed facts. requests certification for the observed fact "appraised value" from the securitization trust certifier, on behalf of the Bank to regulatory agency certifier, submitting a fact affidavit of the appraised value. This affidavit withholds all private customer information but reveals the actual appraisal value;
2. Securitization trust certifier makes a "witness" request. FIG. 9 illustrates the fact-exchange cycle 900 for an observed fact under this pattern. In the certification phase 908, Presenter 902 presents full fact 916 for certification by certifier 904. Certifier 904 replies with a fact certificate 918. In the fact presentation phase 910 presenter 902 presents a digest 920 of the certificate 918 to receiver 906. In the verification phase 912 912, receiver 906 communicates digest 922 to certifier 904 and receives verification confirmation 924. Under agreed conditions 914 such as a court subpoena, receiver 906 communicates subpoena 926 and digest 922 to certifier 904, who in turn responds with the full fact 916 or certificate 918.
3. Securitization trust certifier issues certificate;
4. Bank presents the observed fact certificate to Securitization trust; and
5. Regulatory agency is allowed to request full certificate of "appraised value" on a test basis for a small number of facts, or to any fact under a court subpoena.

For fact "loan terms":
1. Bank deduces the loan terms, a deduced fact, from appraised value and an assumption on future market value of the asset. Bank then requests certification for this deduced fact from the securitization trust certifier;
2. Securitization trust certifier makes a "witness" request, as shown in FIG. 9, to regulatory agency certifier, submitting a fact affidavit of the loan terms. This affidavit withholds all private information but reveals the loan amount and payment agreement;
3. Securitization trust certifier issues certificate;
4. Bank presents the observed fact certificate to Securitization trust; and
5. Regulatory agency is allowed to request full certificate of "loan term" on a test basis for a small number of facts, or to any fact under a court subpoena.

For fact "MBS valuation":
1. Securitization trust deduces the MBS valuation, a deduced fact, from loan terms of several loans, and an assumption regarding future market conditions in the housing market. Securitization trust then requests certification for this deduced fact from the regulatory agency certifier. The regulatory agency does not have the full certificate of the basis facts (loan terms) but has the values that are required to execute the reasoning process used to calculate the MBS valuation;
2. Regulatory agency certifier issues certificate;
3. Securitization trust presents the deduced fact certificate to investor; and
4. Investor makes a verification request to Regulatory agency certifier.

9.8.8 Responsiveness to Concerns

This embodiment allows only the securitization trust certifier to have the private customer information. Still, the investor has the complete structure of assets that are included in the MBS—it has the appraised value of each the corresponding load terms set, even though it does not know the exact identity of these assets. The assumptions that go into the valuation are completely clear. The arithmetic calculations are checked by the certifiers and are clearly stated. To allow the investor to trust the withheld private information, the regulatory agency is allowed to make "strong" verification requests to the securitization trust certifier regarding a small number of facts and check that the affidavits submitted match the full information. Furthermore, in an extreme case under a court subpoena the securitization trust certifier is required to disclose all full fact certificates upon request.

10 Presentation of Certified Facts in Communications, Media and Publications

The following discusses methods to present certified facts in written, printed, visual and digital communication. The methods of presentation discussed are meant to distinguish certified facts from non-certified facts and to turn certified facts into pieces of information that are obviously and conspicuously trustworthy.

10.1 Attaching the Fact Certificates

If self-contained fact certificates (as described in an embodiment above) can be attached to the document in which the certified facts are presented, a certified fact can present a footnote referring to the attached certificate.

10.2 Citing the Fact Certificate

Fact receivers are able to contact Certifiers in order to complete the verification phase of the fact-exchange cycle. To simplify the presentation of facts, certifiers may provide fact presenters and receivers with an additional "certificate presentation" service, in addition to the fact certification and fact verification services.

Figure 16:
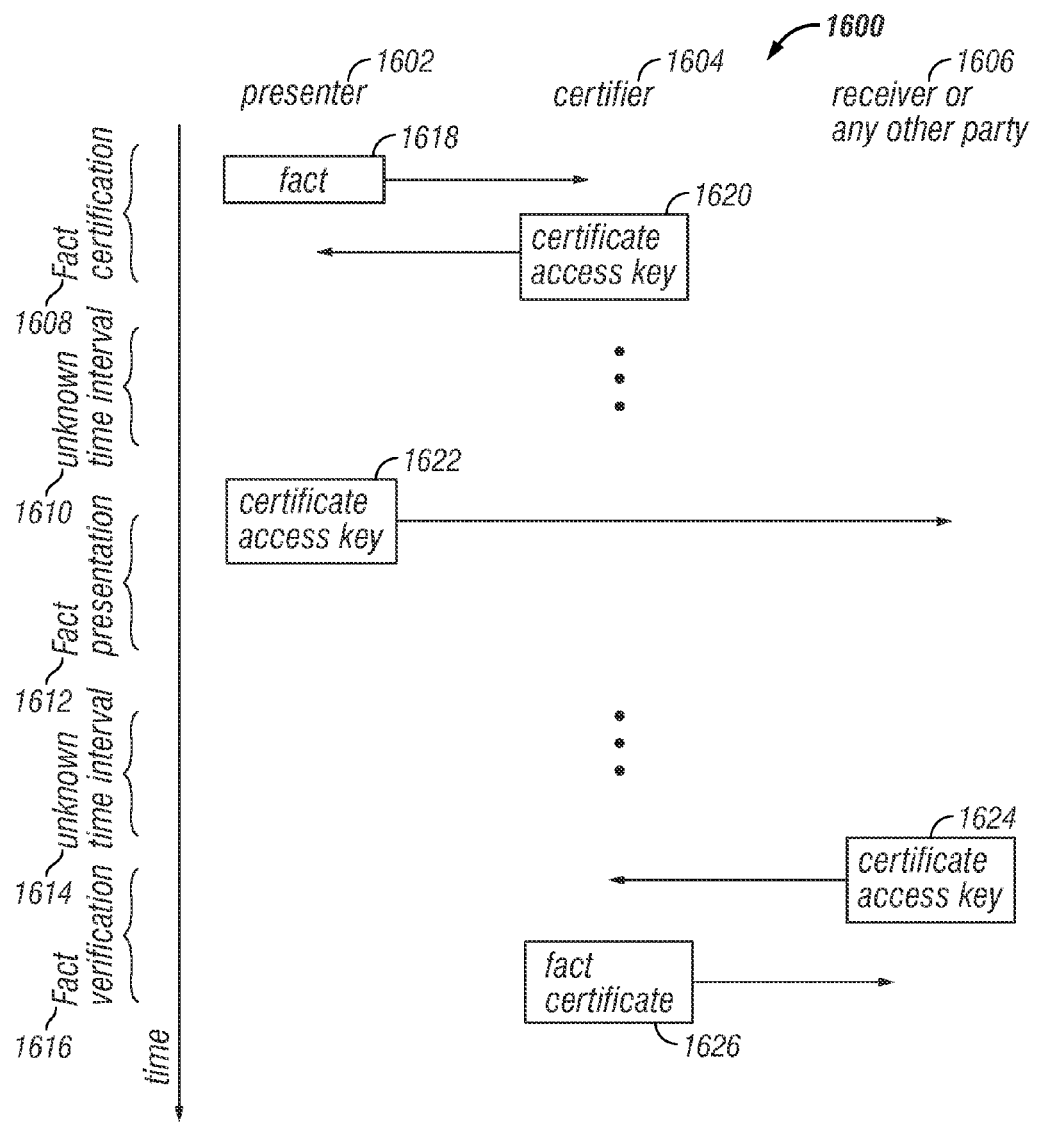
FIG. 16 provides a process chart illustrating a certificate presentation service.

To provide the fact presentation service, once the certifier issues a certificate, it need not communicate the certificate to the presenter. Instead, it may store the certificate in a secure location. Access to the secure location is allowed to anyone with an access key, which is specific to the certificate. The certifier communicates the access key to the presenter in a secure fashion. With the access key in hand, the presenter can allow anyone to access and retrieve the certificate by giving them the Certifier's public address and the access key. Any party (usually, the fact receiver) who was given the access key by the presenter may contact the Certifier, present the access key and retrieve the certificate for inspection. The "certificate presentation" service is illustrated in FIG. 16. The fact-exchange cycle 1600 with the certificate presentation service involves exchange of certificate access keys rather than exchange of certificates. In the presentation phase 1608, presenter 1602 presents fact 1618 to certifier 1604. Certifier 1604 creates fact certificate (162) but instead of returning the fact certificate, the certificate is stored and an access key 1620 is returned. In the fact presentation phase 1612, the presenter 1602 sends the access key 1622 to the receiver 1601 (11). In the fact verification phase 1616, the receiver 1606 sends access key 1624 to certifier 1604, who in response retrieves the certificate 1626 from storage and returns it to receiver 1606. It will be apparent that arbitrary time intervals 1610, 1614 may elapse between the various stages of act-exchange cycle 1600.

To present a certified fact with this service available, the presenter presents the access key alongside the fact. Even though the certificate is not provided, it is made available and the certifier can retrieve it at will. This method allows the presenter to present facts that are obviously and conspicuously trustworthy.

10.3 an Exemplary Embodiment

The embodiment described, wherein the certifier is an Internet HTTP server, provides a natural implementation to the certificate presentation service. The access key is simply the secure digest of the certificate, as discussed above. The certifier replies to an HTTP GET request to the URL of the form <Certifier address>/<UFI> with the certificate.

For example, upon receiving the request:

```
'GET
    <https://certifier.utilityinc.com/certifier/
    5440118b9d473998df57e02dfe2b7d6aa09353cf> and checking the
    requester's credentials, the Certifier mayl reply with the certificate
'HTTP/1.1 200 OK
MIME-Version: 1.0
Content-Type: multipart/mixed; boundary=FACT-CERTIFICATE-
BOUNDRY
Countent-ID:
<certifier.utilityinc.com/certifier/
5440118b9d473998df57e02dfe2b7d6aa09353cf>
--FACT-CERTIFICATE-BOUNDRY--
Content-Type: application/json
{
"certifier":"https://certifier.utilityinc.com",
"oberver-id":"gauge19982@certifier.3rd-party.com/utilityinc",
"obervation-time":"2012-02-16T01:44Z",
}
--FACT-CERTIFICATE-BOUNDRY--
Content-Type: text/plain
12.076 [kWh]
--FACT-CERTIFICATE-BOUNDRY--'
```

There are at present several alternative methods to attach an access key in the form of a URL to a certified fact:

1. In digital documents, such as HTML documents, the certified fact may be a hyperlink that leads to the access key URL. For example, is the certified fact is 12.076 [kWh] then the HTML source will be:

```
<A href='https://certifier.utilityinc.com/certifier/
5440118b9d473998df57e02dfe2b7d6aa09353cf'> 12.076 </A>;
```

2. In visual communication (such as lecture slides, billboards, etc) the access key URL can be given as a barcode that can be scanned by mobile devices with Internet access, such as a Quick Response (QR) barcode (ISO/IEC 18004:2006 standard); and
3. Finally, the URL itself can be added in small print.

10.4 an Additional Embodiment

When a document contains multiple certified facts, the Certifier may offer a service of presenting multiple certificates in exchange for a single access key. In this alternative embodiment, every page or every document containing multiple certified facts that were certified by the same Certifier presents a single access key (using any of the above methods or any other method). In exchange to this access key, the Certifier provides the fact certificates for all certified facts on the document or page.

11. Computer-Implemented System for Certification of Facts

Figure 17:
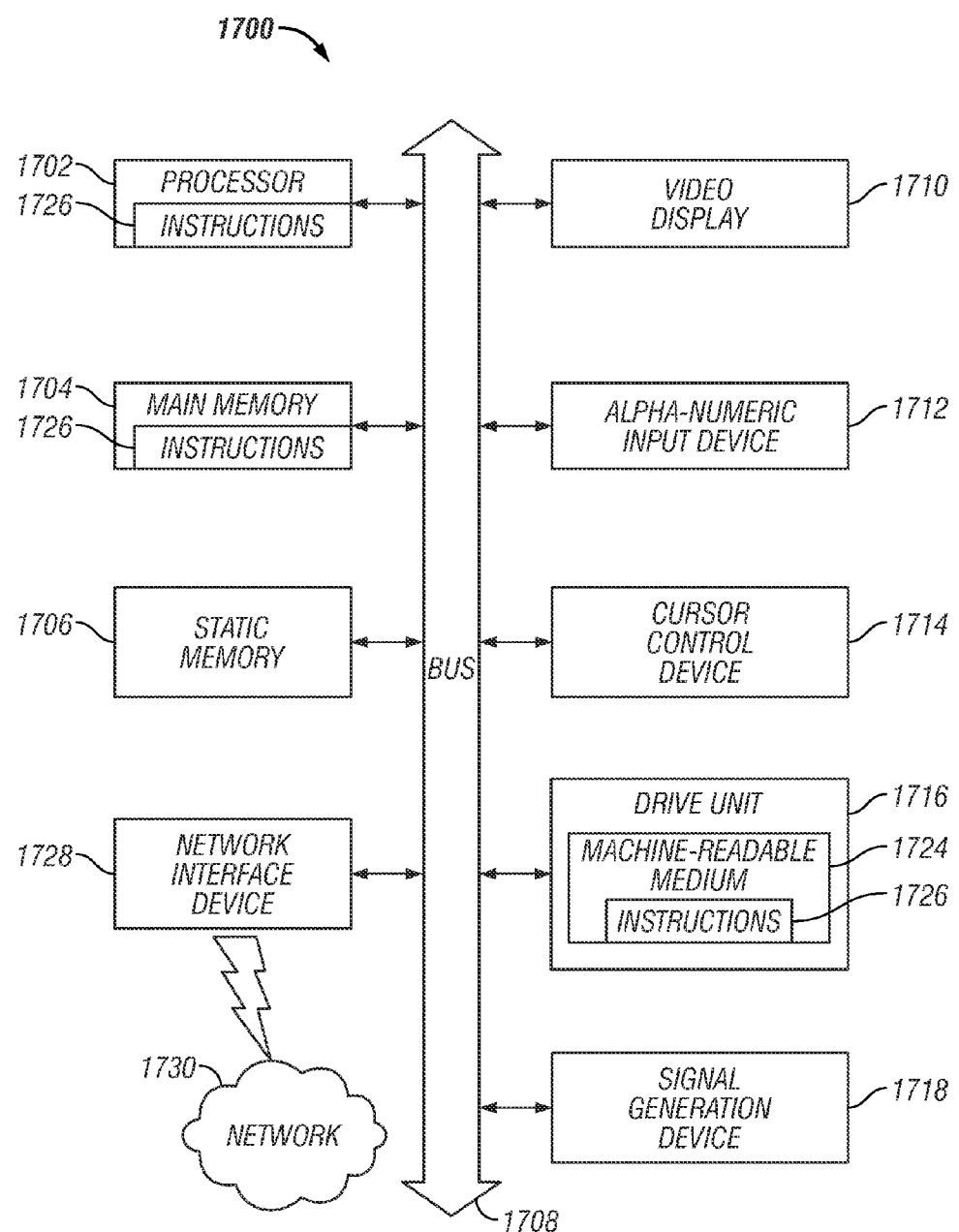
FIG. 17 provides a diagram of a machine in the exemplary form of a computer platform within which a set of instructions, for causing the machine to perform any one of the methodologies discussed herein below, may be executed.

Referring now to FIG. 17, shown is a diagrammatic representation of a machine in the exemplary form of a computer platform 1700 within which a set of instructions for causing the machine to perform any one of the methodologies discussed herein below may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer platform 1700 includes a processor 1702, a main memory 1704 and a static memory 1706, which communicate with each other via a bus 1708. The computer platform 1700 may further include a display unit 1710, for example, a liquid crystal display (LCD) or a cathode ray tube (CRT). The computer platform 1700 also includes an alphanumeric input device 1712, for example, a keyboard; a cursor control device 1714, for example, a mouse; a disk drive unit 1716, a signal generation device 1718, for example, a speaker, and a network interface device 1728.

The disk drive unit 1716 includes a machine-readable medium 1724 on which is stored a set of executable instructions, i.e. software, 1726 embodying any one, or all, of the methodologies described herein below. The software 1726 is also shown to reside, completely or at least partially, within the main memory 1704 and/or within the processor 1702. The software 1726 may further be transmitted or received over a network 1730 by means of a network interface device 1728.

In contrast to the platform 1700 discussed above, a different embodiment uses logic circuitry instead of computer-executed instructions to implement processing offers. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large scale integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments of this invention may be used as or to support software programs executed upon some form of processing core (such as the Central Processing Unit of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information. Additionally, a "machine-readable medium" may be understood to mean a "non-transitory" machine-readable medium.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A computer-implemented method for certifying an event, comprising:
sending an observed fact from any of a fact presenter and an observer to a fact certifier for certification of the observed fact, wherein the sent observed fact includes a timestamp that certifies timeliness of the observed fact, wherein the observed fact originates from the observer, wherein the observer has previously been registered with the fact certifier to operate on behalf of the fact presenter, wherein the observer is any of a person or measurement device that can provide observed facts, wherein the registering of the observer with the fact certifier includes:
assigning the observer with a unique observer identifier (ID),
storing the unique observer ID in a database, and
providing a token to the observer that allows proof of the identity of the observer when presenting information; and
receiving a fact certificate at the fact presenter from the fact certifier, responsive to a certification by the fact certifier of the observed fact sent from the fact presenter or the observer to the fact certifier;
wherein, after receipt of the fact certificate at the fact presenter, transmitting fact information directly from the fact presenter to a fact receiver;
wherein the transmitted fact information includes any of the observed fact and the received fact certificate; and
wherein the fact receiver is enabled to establish that the event is valid, using the observed fact or the fact certificate.

2. The method of claim 1, wherein the transmitted fact information includes both the observed fact and the fact certificate;
wherein the fact receiver receives both the observed fact and the fact certificate; and
wherein the fact receiver enabled to establish that the event is valid, using both the observed fact and the fact certificate.

3. The method of claim 1, wherein the fact presenter knows a plurality of facts, and wherein less than all of the facts are revealed to any of the fact certifier and the fact receiver.

4. The method of claim 3, wherein at least one of the facts that are revealed to the fact certifier or the fact receiver is determined using any of a random selection and selection by the fact receiver.

5. The method of claim 4, wherein the fact receiver is enabled to establish that each of the plurality of facts is valid, and wherein the fact receiver does not know each of the plurality of facts except for those revealed.

6. The method of claim 3, wherein each of the plurality of facts have a unique identifier associated therewith.

7. The method of claim 1, wherein the transmitted fact information includes a visual emblem.

8. The method of claim 7, wherein the visual emblem enables the fact receiver to access the fact certificate.

9. The method of claim 1, further comprising:
broadcasting the fact certificate from the fact presenter to a plurality of witnesses;
wherein a level of trust between the fact receiver and one or more of the witnesses enables the fact receiver to trust any of the observed fact and the fact certificate.

10. The method of claim 1, wherein any of the certified observed fact and the fact certificate are broadcast to a plurality of fact receivers by the fact presenter.

11. The method of claim 1, wherein identity of the fact receiver is not known to at least one of the observer and the fact presenter.

12. The method of claim 1, wherein the observed fact comprises any of an amount paid in cash, a credit card swipe, a bank transaction, a security trade, a picture taken by a camera, a presence of a person or an object at a certain place at a certain time, a medical image, a chemical analysis of a substance, a reading of a utility consumption gauge, a reading from a vehicle speedometer, a genetic sequence measured by a sequencing machine, a report by a witness of an incident, a witness by a notary regarding identification of a person at a certain place at a certain time, a report by an appraisal professional regarding status of an asset, a blood pressure or body temperature measurement, and a specific antidote test performed on a blood sample.

13. The method of claim 1, wherein the event includes an exchange of a document.

14. The method of claim 13, wherein a person declares that the document is valid.

15. The method of claim 1, wherein the event includes any of a physical event, a measurement, an electronic transaction and a financial transaction.

16. The method of claim 15, wherein the physical event includes any of at least two people being in a common location concurrently, a person being close to an object at a given time, and at least two objects being in a common place concurrently.

17. The method of claim 15, wherein the measurement is performed by a measurement device.

18. The method of claim 17, wherein the measurement device is any of a speed measurement device, a sensor, a camera, and an audio recorder.

19. The method of claim 1, wherein the observed fact comprises any of a measurement or an observation.

20. The method of claim 19, wherein the measurement or the observation is not revealed to the fact receiver.

21. The method of claim 1, wherein the observed fact comprises one of a measurement and an observation performed by the observer.

22. The method of claim 1, further comprising:
sending a deduced fact from the fact presenter to the fact certifier for certification of the deduced fact, wherein the deduced fact is based on any of a deductive reasoning process and one or more basis facts.

23. The method of claim 22, wherein identity of the deduced fact is not known to the observer at time of execution of the deductive reasoning process.

24. The method of claim 22, further comprising:
via a computing device, any of presenting, storing and transmitting the deduced fact in an interconnected data structure that allows efficient certification and communication of facts deduced from other facts by the deductive reasoning process, wherein the data structure comprises a tree of facts, wherein:
the deduced fact comprises a root node of the tree;
wherein the basis facts comprise nodes of the tree; and
wherein the observed fact comprises a leaflet of the tree.

25. The method of claim 22, wherein a fact certification library containing executable code allows repetition of the deductive reasoning process.

26. The method of claim 22, wherein the fact presenter and the fact receiver are enabled to achieve lasting or permanent consensus that a statement regarding the deductive reasoning process used to deduce the deduced fact from other facts represents a description of the deductive reasoning process used.

27. The method of claim 22, wherein the fact presenter and the fact receiver are enabled to achieve lasting or permanent consensus that the deduced fact that was deduced from other facts by the deductive reasoning process represents the result of an application of the deductive reasoning process.

28. A computer-implemented method for certifying an event, comprising:
registering an observer that can operate on behalf of a fact presenter at a fact certifier, wherein the observer is any of a person or measurement device that can provide observed facts, wherein the registering the observer includes:
assigning the observer with a unique observer identifier (ID),
storing the unique observer ID in a database, and
providing a token to the observer that allows proof of the identity of the observer when presenting information;
receiving at the fact certifier an observed fact related to the event and the assigned unique ID or token from either the fact presenter or the registered observer on behalf of the fact presenter, wherein the received observed fact includes a timestamp that certifies timeliness of the observed fact;
certifying the received observed fact at the fact certifier as being authentic and attributed to the registered observer corresponding to the assigned unique ID or token;
certifying the event based on the certification of the observed fact at the fact certifier; and
sending a fact certificate from the fact certifier to the fact presenter, wherein the fact certificate corresponds to the certified event, wherein, after receipt of the fact certificate, the fact presenter is enabled to transmit fact information directly to a fact receiver, wherein the fact information transmitted directly from the fact presenter to the fact receiver includes any of the related observed fact and the fact certificate, and wherein the fact receiver is enabled to establish that the event is valid, using the received fact information.

29. The method of claim 28, wherein the event comprises any of a transaction, a meeting, an agreement, an ownership, and a measurement.

30. The method of claim 28, wherein the certification of the observed fact corresponds to any of a location and an identity factor.

31. The method of claim 28, wherein the timestamp is established by a witness.

32. The method of claim 30, wherein the location corresponds to GPS information.

33. The method of claim 30, wherein the identity factor includes any of a digital signature and a device identity.

34. The method of claim 28, wherein the observed fact corresponds to any of a physical event, a paper document, a measurement, an electronic event, and a financial transaction.

35. The method of claim 28, further comprising:
establishing the fact certificate for any of the observed fact and the event.

36. The method of claim 28, further comprising:
broadcasting the fact certificate to a plurality of witnesses;
wherein a level of trust between a fact receiver and one or more of the witnesses enables the fact receiver to trust any of the fact certificate, the observed fact and the event.

37. A computer-implemented method for certifying an event, comprising:
sending an observed fact from any of a fact presenter and an observer to a fact certifier for certification of the observed fact, wherein the sent observed fact includes a timestamp that certifies timeliness of the observed fact, wherein the observed fact originates from the observer, wherein the observer has previously been registered with the fact certifier to operate on behalf of the fact presenter, wherein the observer is any of a person or measurement device that can provide observed facts, wherein the registering of the observer with the fact certifier includes:
assigning the observer with a unique observer identifier (ID),
storing the unique observer ID in a database, and
providing a token to the observer that allows proof of the identity of the observer when presenting information;
receiving a fact certificate at the fact presenter from the fact certifier, responsive to a certification by the fact certifier of the observed fact sent from the fact presenter or the observer to the fact certifier;
broadcasting the fact certificate from the fact presenter to a plurality of witnesses; and
responsive to reception of the fact certificate by the fact presenter, transmitting fact information from the fact presenter directly to a fact receiver;
wherein the transmitted fact information includes any of the observed fact and the fact certificate;
wherein the fact receiver is enabled to establish that the event is valid, using the observed fact or the fact certificate; and
wherein a level of trust between the fact receiver and one or more of the witnesses enables the fact receiver to trust any of the observed fact and the fact certificate.

38. A computer-implemented method for certifying an event, comprising:
- registering an observer that can operate on behalf of a fact presenter at a fact certifier, wherein the observer is any of a person or measurement device that can provide observed facts, wherein the registering the observer includes:
  - assigning the observer with a unique observer identifier (ID),
  - storing the unique observer ID in a database, and
  - providing a token to the observer that allows proof of the identity of the observer when presenting information;
- receiving at the fact certifier an observed fact related to the event and the assigned unique ID or token from either the fact presenter or the registered observer on behalf of the fact presenter, wherein the received observed fact includes a timestamp that certifies timeliness of the observed fact;
- certifying the received observed fact at the fact certifier as being authentic and attributed to the registered observer corresponding to the assigned unique ID or token;
- certifying the event based on the certification of the observed fact at the fact certifier; and
- sending a fact certificate from the fact certifier to the fact presenter, wherein the fact certificate corresponds to the certified event, wherein responsive to receipt of the fact certificate, the fact presenter is enabled to broadcast the fact certificate to a plurality of witnesses, and transmit fact information directly to a fact receiver, wherein the fact information includes any of the related observed fact and the fact certificate, and
- wherein the fact receiver is enabled to establish that the event is valid, using the received fact information, wherein a level of trust between a fact receiver and one or more of the witnesses enables the fact receiver to trust any of the fact certificate, the observed fact and the event.

39. A computer-implemented method for certifying an event, comprising:
- sending a deduced fact from a fact presenter to a fact certifier for certification of the deduced fact, wherein the deduced fact is based on any of a deductive reasoning process and one or more basis facts;
- receiving a fact certificate at the fact presenter from the fact certifier, responsive to a certification by the fact certifier of the deduced fact sent from the fact presenter or the observer to the fact certifier;
- responsive to reception of the fact certificate by the fact presenter, transmitting fact information from the fact presenter directly to a fact receiver;
- wherein the transmitted fact information includes the deduced fact in an interconnected data structure that allows efficient certification and communication of facts deduced from other facts by the deductive reasoning process, wherein the data structure comprises a tree of facts, wherein:
  - the deduced fact comprises a root node of the tree;
  - wherein the basis facts comprise nodes of the tree; and
  - wherein the observed fact comprises a leaflet of the tree; and
- wherein the fact receiver is enabled to establish that the event is valid, using the deduced fact.

40. A computer-implemented method for certifying an event, comprising:
- sending a deduced fact from a fact presenter to a fact certifier for certification of the deduced fact, wherein the deduced fact is based on any of a deductive reasoning process and one or more basis facts, wherein a fact certification library containing executable code allows repetition of the deductive reasoning process;
- receiving a fact certificate at the fact presenter from the fact certifier, responsive to a certification by the fact certifier of the deduced fact sent from the fact presenter or the observer to the fact certifier;
- responsive to reception of the fact certificate by the fact presenter, transmitting fact information from the fact presenter directly to a fact receiver;
- wherein the transmitted fact information includes any of the deduced fact and the fact certificate;
- wherein the fact receiver is enabled to establish that the event is valid, using the deduced fact or the fact certificate.

41. A computer-implemented method for certifying an event, comprising:
- sending a deduced fact from a fact presenter to a fact certifier for certification of the deduced fact, wherein the deduced fact is based on any of a deductive reasoning process and one or more basis facts;
- receiving a fact certificate at the fact presenter from the fact certifier, responsive to a certification by the fact certifier of the deduced fact sent from the fact presenter or the observer to the fact certifier;
- responsive to reception of the fact certificate by the fact presenter, transmitting fact information from the fact presenter directly to a fact receiver;
- wherein the transmitted fact information includes any of the deduced fact and the fact certificate;
- wherein the fact receiver is enabled to establish that the event is valid, using the deduced fact or the fact certificate;
- wherein the fact presenter and the fact receiver are enabled to achieve lasting or permanent consensus that a statement regarding the deductive reasoning process used to deduce the deduced fact from other facts represents a description of the deductive reasoning process used.

42. A computer-implemented method for certifying an event, comprising:
- sending a deduced fact from a fact presenter to a fact certifier for certification of the deduced fact, wherein the deduced fact is based on any of a deductive reasoning process and one or more basis facts;
- receiving a fact certificate at the fact presenter from the fact certifier, responsive to a certification by the fact certifier of the deduced fact sent from the fact presenter or the observer to the fact certifier;
- responsive to reception of the fact certificate by the fact presenter, transmitting fact information from the fact presenter directly to a fact receiver;
- wherein the transmitted fact information includes any of the deduced fact and the fact certificate;
- wherein the fact receiver is enabled to establish that the event is valid, using the deduced fact or the fact certificate;
- wherein the fact presenter and the fact receiver are enabled to achieve lasting or permanent consensus that the deduced fact that was deduced from other facts by the deductive reasoning process represents the result of an application of the deductive reasoning process.

* * * * *